US012267942B2

(12) United States Patent
Gribb et al.

(10) Patent No.: US 12,267,942 B2
(45) Date of Patent: Apr. 1, 2025

(54) COOLING PLATE ASSEMBLY FOR PLASMA WINDOWS POSITIONED IN A BEAM ACCELERATOR SYSTEM

(71) Applicant: SHINE Technologies, LLC, Janesville, WI (US)

(72) Inventors: Tye Gribb, Fitchburg, WI (US); Preston Barrows, Madison, WI (US)

(73) Assignee: SHINE Technologies, LLC, Janesville, WI (US)

( * ) Notice: Subject to any disclaimer, the term of this patent is extended or adjusted under 35 U.S.C. 154(b) by 14 days.

(21) Appl. No.: 17/951,975

(22) Filed: Sep. 23, 2022

(65) Prior Publication Data

US 2024/0107653 A1 Mar. 28, 2024

(51) Int. Cl.
*H05H 6/00* (2006.01)
*G21G 1/10* (2006.01)

(52) U.S. Cl.
CPC ................. *H05H 6/00* (2013.01); *G21G 1/10* (2013.01); *H05H 2006/002* (2013.01); *H05H 2242/10* (2013.01); *H05H 2277/116* (2013.01)

(58) Field of Classification Search
CPC ............... H05H 7/22; H05H 2277/116; H05H 2242/10; H05H 1/24; H05H 2006/002; H01J 37/321; G21G 1/10
See application file for complete search history.

(56) References Cited

U.S. PATENT DOCUMENTS 5,519,738 A * 5/1996 Hirose ..................... G21G 1/10 376/195
5,578,831 A 11/1996 Hershcovitch
6,528,948 B1 3/2003 Hershcovitch et al.
6,724,003 B1 4/2004 Doi et al.
7,703,413 B2 4/2010 Miebach et al.
(Continued)

FOREIGN PATENT DOCUMENTS

CN 110708857 A 1/2020
WO 2013116787 A1 8/2013
WO 2024081327 A1 4/2024

OTHER PUBLICATIONS

International Search Report and Written Opinion dated May 23, 2024, pertaining to Int'l Patent Application No. PCT/US23/33495, 6 pgs.

(Continued)

*Primary Examiner* — Tuan T Lam
(74) *Attorney, Agent, or Firm* — Dinsmore & Shohl LLP

(57) ABSTRACT

A beam accelerator system operable to produce a medical isotope, including an ion accelerator that generates an ion beam; a low-pressure chamber; an anode adjacent and fluidly connected to the low-pressure chamber; a plasma window adjacent and fluidly connected to the anode; and a cathode housing adjacent and fluidly connected to the plasma window. The plasma window has a plurality of plates, each plate having an aperture that is aligned with an aperture in one or more adjacent plates to form a plasma channel. One or more plates in the plurality of plates includes a unitary plate having an aperture therein, and one or more cooling channels entering the unitary plate at a first side of the unitary plate and exiting the unitary plate at a second side of the unitary plate. The one or more cooling channels run through a thickness of the unitary plate.

20 Claims, 11 Drawing Sheets

(56) References Cited

U.S. PATENT DOCUMENTS

| | | | | |
|---|---|---|---|---|
| 9,734,926 | B2 | 8/2017 | Piefer | |
| 2003/0049468 | A1 | 3/2003 | Hu et al. | |
| 2004/0100214 | A1* | 5/2004 | Erdman | G21G 1/10 315/500 |
| 2009/0090875 | A1* | 4/2009 | Gelbart | G21K 1/14 250/492.1 |
| 2017/0251547 | A1* | 8/2017 | Ito | H05H 6/00 |
| 2017/0301410 | A1 | 10/2017 | Stubbers et al. | |
| 2017/0330739 | A1 | 11/2017 | Hosaka | |
| 2018/0190471 | A1 | 7/2018 | Budge | |
| 2018/0206323 | A1 | 7/2018 | Kobernik et al. | |
| 2019/0259505 | A1* | 8/2019 | Murakami | G21K 5/08 |
| 2021/0158987 | A1 | 5/2021 | Johnson et al. | |
| 2022/0270775 | A1 | 8/2022 | Piefer | |
| 2022/0359492 | A1* | 11/2022 | Liu | H01L 21/823475 |
| 2024/0107653 | A1 | 3/2024 | Gribb et al. | |

OTHER PUBLICATIONS

Kroesen, et al., "Description of a Flowing Cascade Arc Plasma," Plasma Chemistry and Plasma Processing, vol. 10, No. 4, 1990.

Vijvers, W. A. J. (2011). A high-flux cascaded arc hydrogen plasma source. Technische Universiteit Eindhoven. https://doi.org/10.6100/IR710985.

Ikoma et al., "Demonstration of Plasma Window with 20 mm Diameter and Pressure Separation for Accelerator Applications," Plasma and Fusion Research, 2019, vol. 14, pp. 1206148.

Krasik et al., "Plasma window characterization," Journal of Applied Physics 101, 053305 (2007).

Huang et al., "Quantitative characterization of arc discharge as vacuum interface," Physics of Plasmas 21, 123511 (2014); doi: 10-1063/1.4903462.

* cited by examiner

COOLING PLATE ASSEMBLY FOR PLASMA WINDOWS POSITIONED IN A BEAM ACCELERATOR SYSTEM

STATEMENT REGARDING FEDERALLY SPONSORED RESEARCH AND DEVELOPMENT

The present disclosure was developed with Government support under Contract No. DE-AR0001377 awarded by the United States Department of Energy. The Government has certain rights in the present disclosure.

BACKGROUND

Field

The present disclosure generally relates to cooling plates for plasma window systems, particularly plasma window systems used in a beam accelerator system, such as, for example, a gaseous-target neutron generation system.

Technical Background

Beam accelerator systems are used to produce medical-grade radioactive isotopes used by doctors in nuclear medicine. Generally speaking, beam accelerator systems include an ion accelerator that generates a high-energy ion beam that is directed to a target chamber through a plasma window. For instance, in gaseous-target neutron generation systems, a high-energy ion beam is directed to a gaseous target. The generation and movement of the high-energy ion beam to the target requires a significant amount of energy and generates a significant amount of heat.

Accordingly, a need exists for components of beam accelerator systems, such as gaseous-target neutron generation systems, that help reduce the cost and energy required to generate radioactive isotopes.

SUMMARY

According to one embodiment, a beam accelerator system operable to produce a medical isotope, the beam accelerator system comprises: an ion accelerator that generates a high-energy ion beam; a low-pressure chamber; an anode adjacent and fluidly connected to the low-pressure chamber; a plasma window adjacent and fluidly connected to the anode; and a cathode housing adjacent and fluidly connected to the plasma window, wherein the plasma window comprises a plurality of plates, each plate comprises an aperture that is aligned with an aperture in one or more adjacent plates to form a plasma channel, and one or more plates in the plurality of plates comprises: a unitary plate having an aperture therein; and one or more cooling channels entering the unitary plate at a first side of the unitary plate and exiting the unitary plate at a second side of the unitary plate, wherein the one or more cooling channels run through a thickness of the unitary plate.

According to another embodiment, a beam accelerator system operable to produce a medical isotope, the beam accelerator system comprising: an ion accelerator that generates a high-energy ion beam; a low-pressure chamber; an anode adjacent and fluidly connected to the low-pressure chamber; a plasma window adjacent and fluidly connected to the anode; and a cathode housing adjacent and fluidly connected to the plasma window, wherein the plasma window comprises a plurality of plates, each plate comprises an aperture that is aligned with an aperture in one or more adjacent plates to form a plasma channel, and one or more plates in the plurality of plates comprises: a first cooling channel and a second cooling channel that run through a thickness of the one or more plates and enters the one or more plates at a first side of the one or more plates and exits the one or more plates at a second side of the plate, wherein the first cooling channel enters the one or more plates at the first side of the one or more plate, extends adjacent to a first side of the aperture, turns in a first direction to extend adjacent to a second side of the aperture, turns in a second direction and extends to exit the one or more plates at a second side of the one or more plate, and the second cooling channel enters the one or more plates at a first side of the one or more plates and extends to a third side of the aperture, turns in the first direction to extend adjacent to the third side of the aperture, turns in the second direction to extend adjacent to a fourth side of the aperture, and exits on the second side of the one or more plate.

According to another embodiment, a beam accelerator system operable to produce a medical isotope, the beam accelerator system comprising: an ion accelerator that generates a high-energy ion beam; a low-pressure chamber; an anode adjacent and fluidly connected to the low-pressure chamber; a plasma window adjacent and fluidly connected to the anode; and a cathode housing adjacent and fluidly connected to the plasma window, wherein the plasma window comprises a plurality of plates, each plate comprises an aperture that is aligned with an aperture in one or more adjacent plates to form a plasma channel, and one or more plates in the plurality of plates comprise a first cooling channel, a second cooling channel, and a third cooling channel that run through a thickness of the one or more plates, wherein the first cooling channel enters the one or more plates at a first side of the one or more plate, extends to a first side of the aperture and splits into the second cooling channel and the third cooling channel, the second cooling channel, extends in a first direction adjacent to the first side of the aperture to a second side of the aperture, turns in a second direction and extends adjacent to the second side of the aperture and exits the one or more plates at a second side of the one or more plate, and the third cooling channel extends in a third direction adjacent to the first side of the aperture to a third side of the aperture, turns in the second direction and extends adjacent to the third side of the aperture and exits the one or more plates at the second side of the one or more plate.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
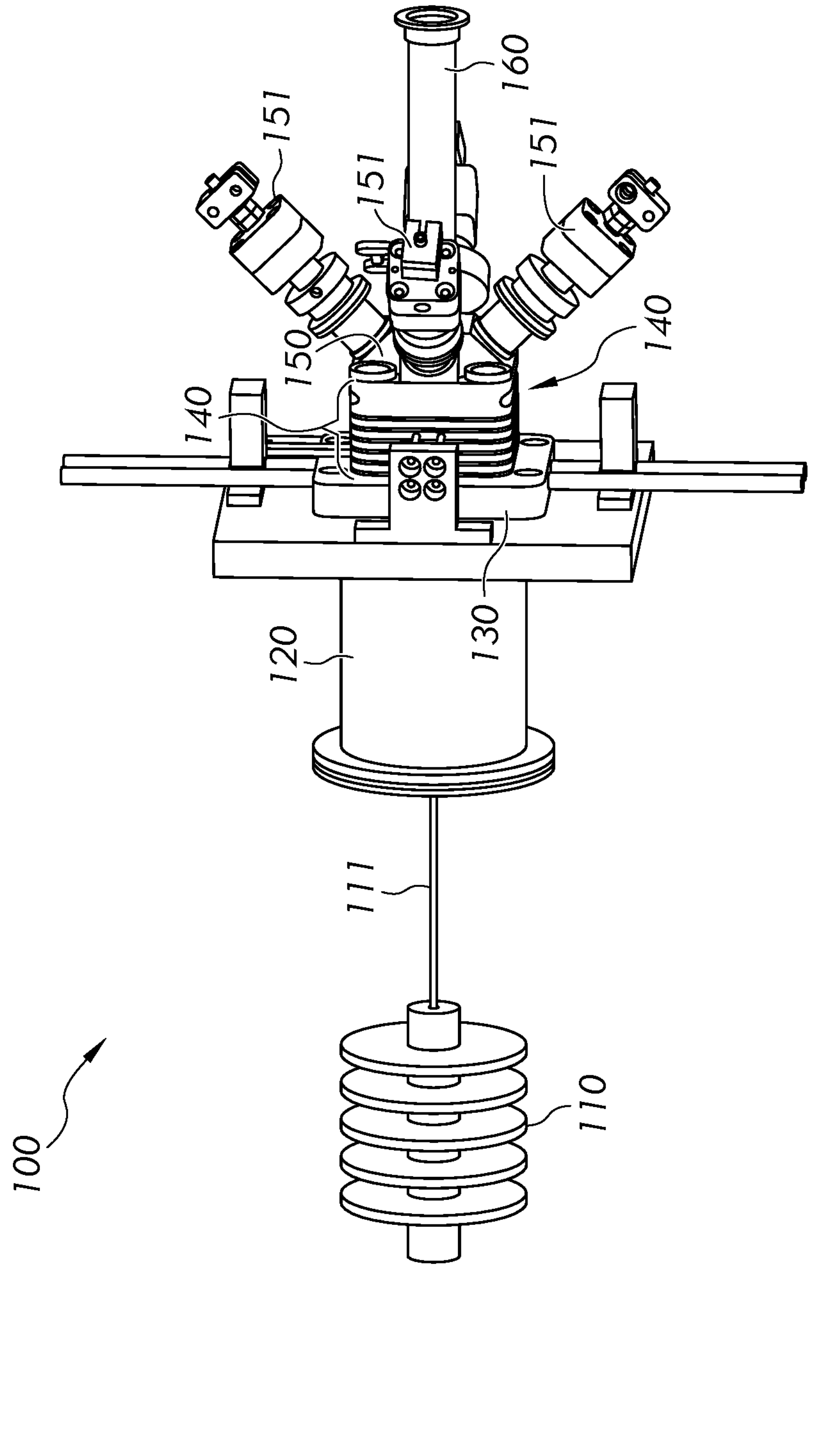
FIG. 1 schematically depicts a gaseous target neutron generation system according to embodiments disclosed and described herein.

Reference will now be made in detail to embodiments of cooling plates for use in plasma windows of beam accelerator systems, embodiments of which are illustrated in the accompanying drawings. Whenever possible, the same reference numerals will be used throughout the drawings to refer to the same or like parts.

According to embodiments, a plasma window is positioned in a gaseous target neutron generation system to operate as a windowless vacuum barrier to separate a low-pressure beamline and a high-pressure gaseous target chamber. The plasma window allows for systems with an increased gaseous target pressure, a shortened target length, and an increased current delivered to the target (e.g., a target gas present in the target chamber). In view of this beam accelerator systems built with plasma windows result in an increase of up to two orders of magnitude in accessible neutron flux compared to traditional beam accelerator systems.

With reference to FIG. 1, an embodiment of a beam accelerator system 100, which is operable to produce a medical isotope, comprises an ion accelerator 110 that generates a high-energy ion beam 111 that is directed to a low-pressure chamber 120. In embodiments, the low-pressure chamber is operated at a vacuum or near vacuum, for example, 1 torr or less, 0.1 torr or less, 0.0.01 torr or less, $1\times10^{-3}$ torr or less, $1\times10^{-5}$ torr or less, $1\times10^{-6}$ torr or less, or the like. An anode 130, is positioned adjacent and fluidly connected to the low-pressure chamber 120 and is separated from a cathode housing 150 by the plasma window 140. The plasma window 140 is adjacent and fluidly connected to both the anode 130 and the cathode housing 105. In embodiments, the anode 130 may be an anode plate. The cathode housing 150 is configured to house a plurality of cathodes 151, which will be described in more detail below. The beam accelerator system 100 also comprises a target chamber 160 for housing a target gas, such as deuterium, tritium, helium, or argon. The target chamber 160 and the cathode housing 150 are pressurized so that the cathode housing 150 is on a high-pressure side of the beam accelerator system 100, and the anode 130 is present on a low-pressure side (e.g., vacuum side) of the beam accelerator system 100. Gases generated by the ion accelerator 101 and those present in the low-pressure chamber 120 do not travel past the anode 130 and into the plasma window 140 or cathode housing 150 because of the pressure differential between the low-pressure side of the beam accelerator system 100 and the high-pressure side of the beam accelerator system 100. It should be understood that FIG. 1 is for illustrative purposes only, and is not drawn to scale.

Traditionally, accelerating ions into a gaseous target chamber (such as target chamber 160) requires large and expensive pumping infrastructure to maintain the low pressure required for the ions to be accelerated from the ion accelerator 110 while maximizing the pressure in the target chamber 160, which is adjacent and fluidly coupled to the cathode housing 150 in the embodiment depicted in FIG. 1. The target chamber 160 may operate at pressures over one million times the pressures present in the beamline 110, for example, pressures of 30 torr or greater, 50 torr or greater, 100 torr or greater, 500 torr or greater, 1000 torr or greater, or any value in a range having any two of these values as endpoints. Larger ion beam sizes and higher current ion beams require more pumping due to the conductance of the ion beam through a channel and into the target. Therefore, the beam size and thus total yield of a system is limited by the diameter of the channel into the target chamber.

Utilizing a plasma window 140 between the anode 130, which is at low pressure, and the cathode housing 150, which is at high pressure, allows for a greater pressure reduction factor relative to traditional channels, facilitating the use of larger diameter and higher power ion beams. The gains from pressure reduction also reduce the total pumping cost due to the decrease in conductance and pumping hardware required to maintain the pressure differential.

Figure 2B:
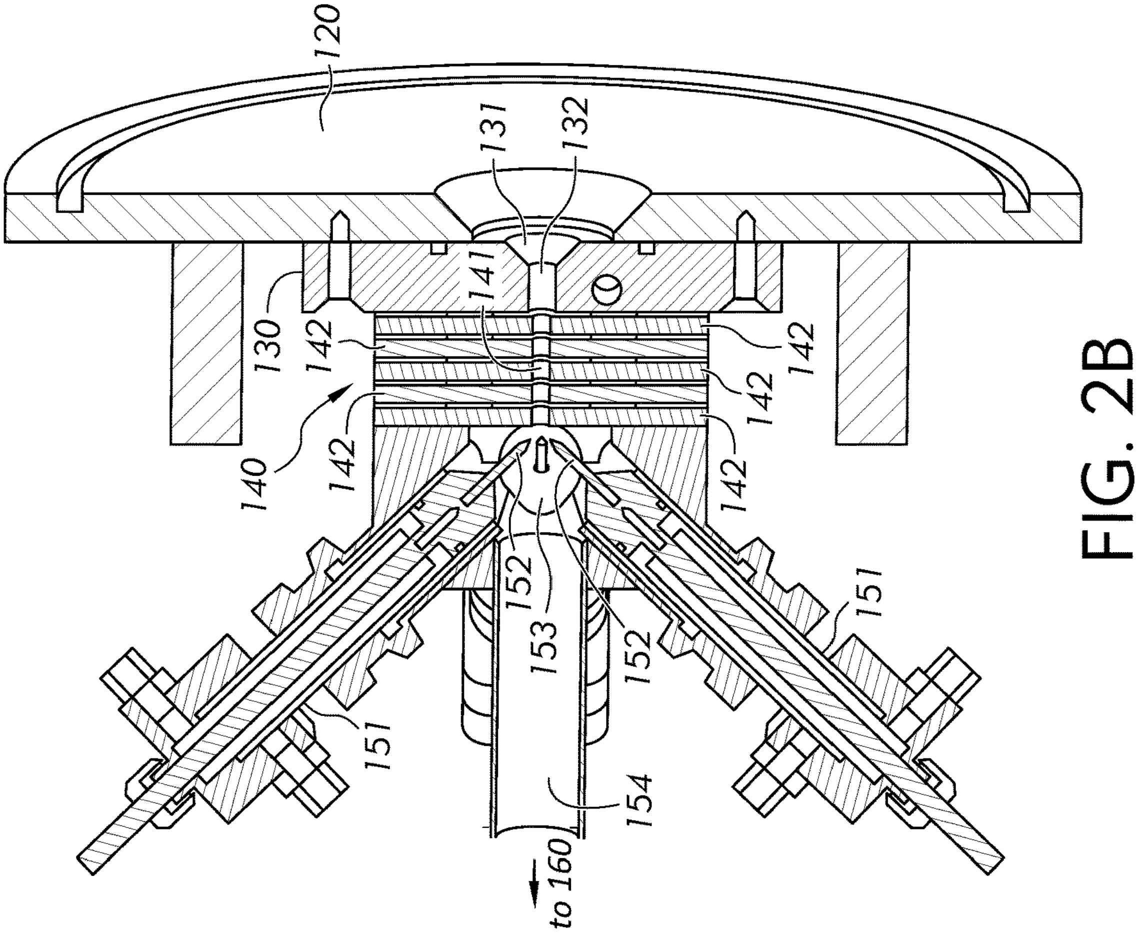
FIG. 2B schematically depicts a cross-section of a low pressure chamber, anode, plasma window, cathode housing, and cathodes according to embodiments disclosed and described herein.
Figure 2A:
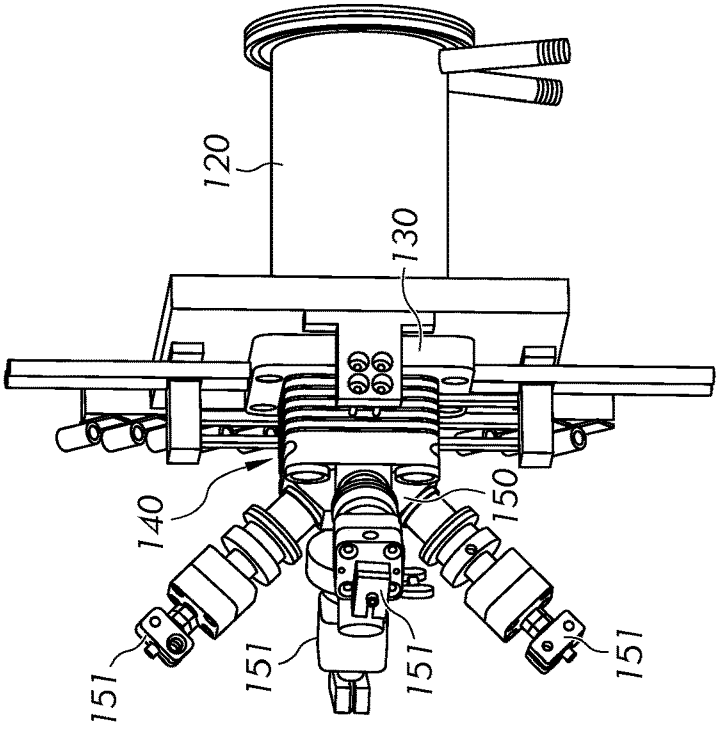
FIG. 2A schematically depicts a low pressure chamber, anode, plasma window, cathode housing, and cathodes according to embodiments disclosed and described herein.

FIG. 2A is a side view of the low-pressure chamber 120, the anode 130, the plasma window 140, the cathode housing 150, and the cathodes 151. As shown in FIG. 2A, the plasma window 140 comprises a plurality of plates that are adjacent and connected to one another. In embodiments, the plasma window 140 comprises from 4 to 8 plates, such as from 5 to 7 plates, or 6 plates. As noted above, the plasma window 140 is positioned between the anode 130 and the cathode housing 150, and the plasma window 140 is connected to both the anode 130 and the cathode housing 150. The cathode housing 150 is configured to support a plurality of cathodes 151. In embodiments, the cathode housing is configured to support four cathodes, three cathodes, or two cathodes. In embodiments where the cathode housing 150 is configured to support four cathodes, the cathodes 151 may be positioned about 90° from one another in the cathode housing 150. In embodiments where the cathode housing 150 is configured to support three cathodes, the cathodes 151 may be positioned about 120° from one another, and in embodiments where the cathode housing 150 is configured to support two cathodes, the cathodes 151 may be positioned about 180° from one another.

FIG. 2B is a cross-section view of the low-pressure chamber 120, the anode 130, the plasma window 140, and the cathode housing 150 depicted in FIG. 2A. The anode 130 is, in embodiments, a grounded plate that comprises a nozzle 131 that is fluidly connected to the low-pressure chamber 120. The nozzle 131 is also fluidly connected to a channel 132 positioned in the anode 130. As will be discussed in more detail below, the nozzle 131 and the channel 132 in the anode 130 operate to funnel the ion beam from the low-pressure side of the beam accelerator system 100 to the plasma window 140. To this end, in one or more embodiments, the anode and/or the low-pressure chamber 120 are mounted to and fluidly connected with a pumping system.

With reference still to FIG. 2B, the plasma window 140 includes five adjacent plates 142 that are connected to one another and separate the anode 130 from the cathode housing 150. It should be understood that embodiments of the plasma window 140 may comprise more or less than five plates 142. Each plate 142 of the plasma window 140 comprises a circular aperture at or near the geometrical center of the plate 142. The circular aperture of each plate 142 is aligned around a central axis so that when the plurality of plates 142 are aligned and connected, the coaxial, circular apertures in the plates 142 form a plasma channel 141 through which the high-energy ion beam will travel from the anode 130 to the cathode housing 150. It should be appreciated that in embodiments the apertures in the plates 142 need not be perfectly circular and may be any shape that can accommodate the transmission of the high-energy ion beam. The plates 142 of the plasma window 140 are, in embodiments, electrically floating and are cooled with a fluid, such as water, which will be discussed in more detail below. By constructing the plates 142 to be electrically floating, the voltage gradient across the plasma channel 141 is not as steep as it would be if the plates 142 were grounded; this can aid the transmission of the high-energy ion beam across the plasma channel 141. In one or more embodiments, separators may be positioned between portions of adjacent plates 142. In embodiments, the separators may comprise a boron nitride spacer (not shown) most proximate to the plasma channel 141, a Viton O-ring surrounding the boron nitride spacer, and a PVC spacer surrounding the Viton O-ring.

Still referring to FIG. 2B, the cathode housing 150 is configured to support a plurality of cathodes 151, as described above. The cathode housing 150 also comprises a cathode target region 153 the is fluidly coupled to the target chamber 160 and in which the target gas housed in the target chamber 160 is also present. Each cathode 151 comprises a cathode needle 152 that extends from the cathode 151 into the cathode target region 153. The cathodes 151 apply a voltage (e.g., a voltage in a range of from 150 V to 250 V, such as 200V) across multiple points in the cathode target region 153 via the cathode needles 152 to initiate and/or maintain the heating and ionization of a portion of the target gas thereby forming the viscous plasma 310. In some embodiments, the cathodes 151 apply voltage to both initiate and maintain the formation of the viscous plasma 310. However, other methods of initiating formation of the viscous plasma 310 are contemplated, such as using one or more initiation coils, such as tesla coils, to apply the initial voltage. Such initiation coils, while not depicted, may be mounted on one or more of the plates 142 of the plasma window 140. Moreover, embodiments comprising initial coils, the cathodes 151 may still apply a voltage to maintain the viscous plasma 310. The cathode target region 153 of the cathode housing 150 is fluidly coupled to the target chamber 160 by a gas inlet 154 and both the target region 160 and the cathode target region 153 operates at a significantly higher pressure than the anode 130 and the low-pressure chamber 120. The target region 160 and the cathode target region 153 may be pressurized by a pumping system or the like. It should be understood that, in some embodiments, the cathode target region 153 is a portion of the target region 160, that is, the portion of the target chamber 160 nearest the cathode needles 152.

Figure 3:
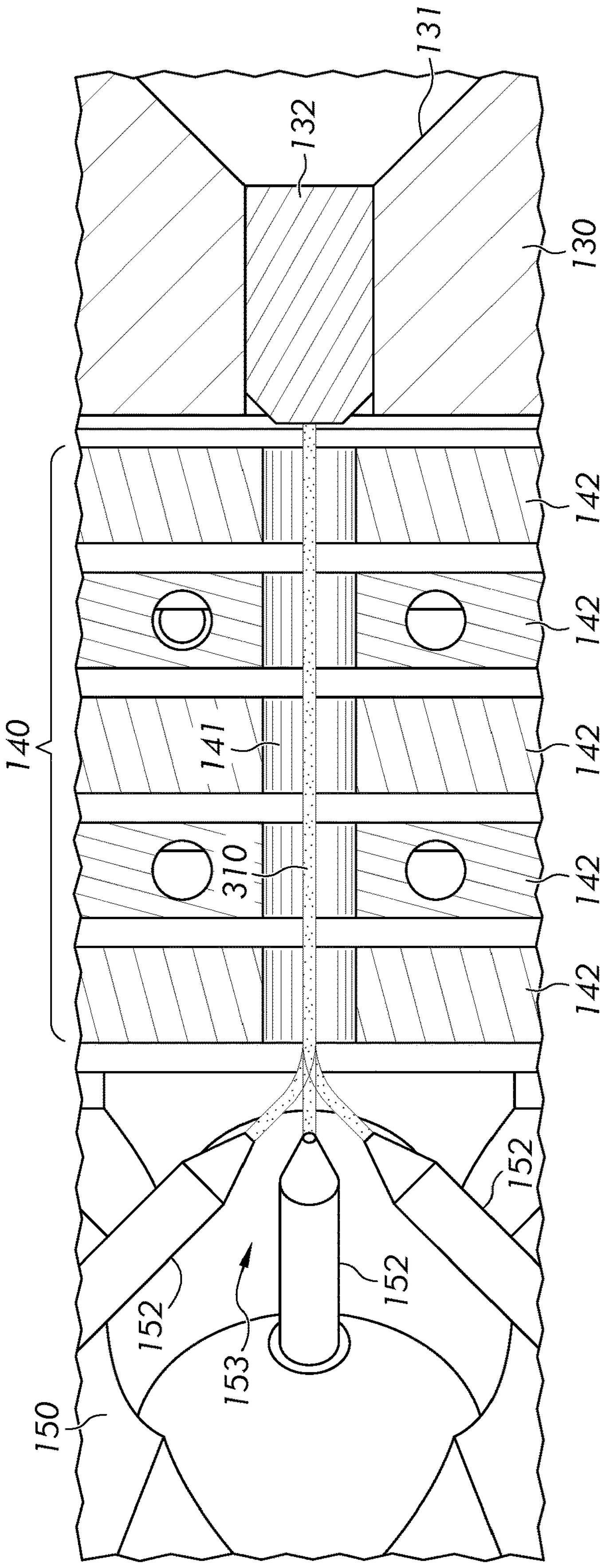
FIG. 3 schematically depicts a cross-section of an anode, plasma window, and cathode housing according to embodiments disclosed and described herein.

The transmission of the high-energy ion beam from the anode 130 through the plasma window 140 to the cathode housing 150 will now be described with reference to FIG. 3, which is a cross-section view of the anode 130, plasma window 140, and cathode housing 150. As mentioned above, the anode 130 may, in embodiments, be an anode plate comprising a nozzle 131 that is fluidly connected to the low-pressure chamber 120 (not shown in FIG. 3) and a channel 132 fluidly connected to the nozzle 131. The plasma window 140 depicted in FIG. 3 includes five adjacent plates 142 having circular apertures coaxially aligned to form plasma channel 141. The plasma channel 141 is fluidly connected to the channel 132 of the anode 130 and the cathode target region 153 of the cathode housing 150. Target gas is introduced into the cathode target region 153 and a viscous plasma 310 is generated at the cathode needles 152 (or at one or more initiation coils) and the viscous plasma 310 fills the plasma channel 141 and extends into the channel 132 in the anode 130. By filling the plasma channel 141 with the viscous plasma 310, a pressure barrier is created between the cathode housing 150 and the anode 130. However, the ion beam from the ion accelerator (shown in FIG. 1) are capable of being transferred through the viscous plasma 310. Therefore, the pressure differential between the high-pressure side of the beam accelerator system 100 and the low-pressure side of the beam accelerator system 100 can be maintained while still transmitting a high-energy ion beam through the beam accelerator system 100.

As described above, the plasma window 140 disclosed and described herein is effective at maintaining pressure differentials in the beam accelerator system 100, which can significantly reduce the costs (both capital and operating) and footprint associated with pumping systems needed in the beam accelerator system 100 that do not utilize one or more plasma windows 140. However, cooling a plasma window 140 once the plasma channel 141 fills with a viscous plasma 310 is a challenge. In particular, it is conventional to use a constant power density on the plasma channel 141 regardless of the diameter of the plasma channel 141. However, as the diameter of the plasma channel 141 increases, the total power applied to the wall of the plasma channel 141 increases, causing extremely high temperatures. Accordingly, the plates 142 of the plasma window 140 may be designed to improve cooling of the plates 142 and the plasma channel 141. Such designs will now be described.

A front view of a plate 142 used in the plasma window 140 according to one or more embodiments will be described with reference to FIG. 4. The plate 142 has a generally square shape with a circular aperture 410 positioned near the geometrical center of the plate 142. However, it should be understood that the shape of the plate may vary according to embodiments. The majority of the plate 142 is constructed from a thermally conductive metal, such as copper, silver, molybdenum, tungsten or related alloys. Additionally, the plate can be a combination of materials. For example, a plate may consist of a largely copper body with a tungsten layer near the arc. In embodiments, the plate 142 is constructed from copper. As described above, when a plurality of plates 142 are placed adjacent to one another, the aperture 410 in each plate 142 aligns to form the plasma channel of the plasma window, and a viscous plasma fills the plasma channel. Accordingly, the diameter of the aperture 410 in each plate 142 is approximately the size of the ion beam that is transmitted through the plasma channel. In embodiments, the aperture 410 has a diameter that is from 1.0 mm to 10.0 mm, such as from 2.0 mm to 8.0 mm, from 3.0 mm to 7.0 mm, or from 4.0 mm to 6.0 mm. In embodiments, the diameter of the aperture may vary along the plasma window to match the varying diameter of the plasma window. In such embodiments, the diameter of the aperture will be greater at one end of the plasma window than the diameter of the aperture at the opposite end of the plasma window. The diameter of the ion beams generated in beam accelerator systems according to embodiments are orders of magnitude larger than the sub one-millimeter diameter of electron beams used in e-beam systems. Accordingly, much smaller aperture diameters could be used in electron beam (e-beam) systems and precision, low-current ion beam applications than in beam accelerator systems according to embodiments that generate high-current ion beams and, as mentioned above, the larger aperture diameters used, the more total power, and heat, is delivered to the aperture walls. That is to say, plates 142 used in plasma windows of ion beam accelerator systems according to embodiments have entirely different cooling requirements than components used in low-current e-beam systems and low-current ion beam systems.

Figure 5:
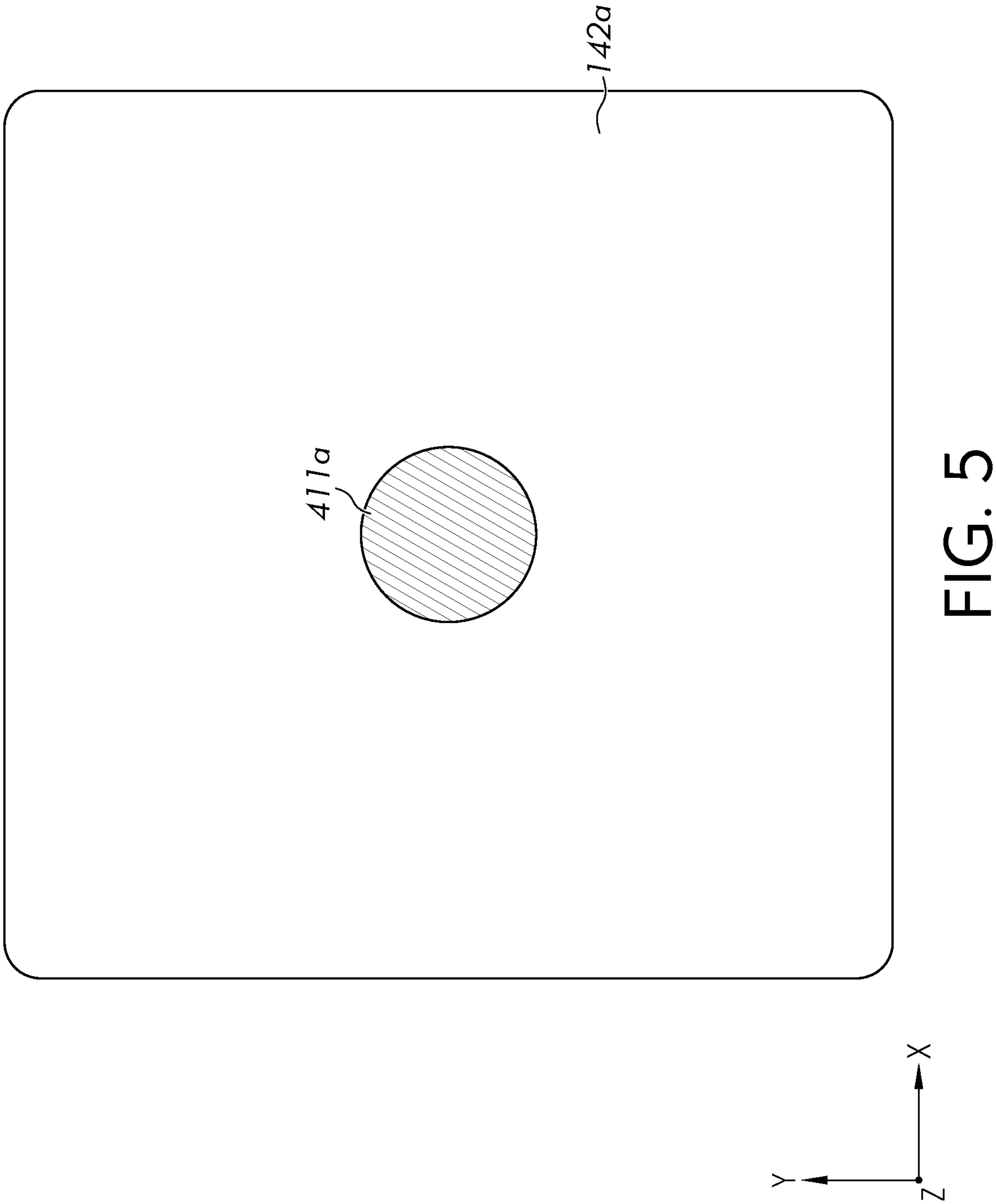
FIG. 5 schematically depicts a front view of a plate having a refractory metal slug according to embodiments disclosed and described herein.

As mentioned above, the high-energy ion beam has approximately the same diameter as the plasma channel and, thereby, the ion beam has approximately the same diameter as aperture 410 of the plate 142. This can lead to significant heat loads in the plate 142, especially around the aperture 410, even when a thermally conductive metal like copper is used to form the plate 142. Moreover, portions of the viscous plasma that fills the plasma channel may contact the inner wall of the aperture 410. Thermally conductive metals traditionally used in industry, such as copper, may not be able to withstand the temperatures caused contact with—or even close proximity to—the viscous plasma. Accordingly, in one or more embodiments disclosed and described herein, a ring of refractory metal 411, such as tungsten or molybdenum, may be used to form the inner wall of the aperture 410 and, thereby the inner wall of the plasma channel. In such embodiments, and with reference to FIG. 5, a thermally conductive metal plate **142*a* (such as a plate made from copper) may be integrally formed around a cylindrical slug 411*a* of the refractory metal, such as by molding liquidus thermally conductive metal around the cylindrical slug 411*a* of refractory metal. Once the thermally conductive metal plate 142*a* is formed, the cylindrical slug 411*a* may be machined to form the aperture 410 with an inner surface of refractory metal 411**.

With reference again to FIG. 4, and as mentioned above, a significant amount of heat is generated when the viscous plasma fills the plasma channel, which creates a large heat load in the plate 142 around the aperture 410. This heat load can lead to poor performance or even failure of the plate 142. Accordingly, cooling channels 421 and 422 may be provided in the plate 142 near the aperture 410. A cooling fluid, such as deionized water or the like, is flushed through the cooling channels 421 and 422, thereby extracting heat from the portion of the plate 142 near the aperture 410 into the cooling fluid. Each cooling channel 421 and 422 extends through the plate 142 so that cold cooling fluid enters the plate 142 at inlets **421*a* and 422*a* of the cooling channels 421 and 422, respectively, positioned at a first side of the plate 142 and exits the plate 142 at outlets 421*b* and 422*b* of the cooling channels 421 and 422, respectively, positioned at a second side of the plate 142. As shown in FIG. 4, a first cooling channel 421 is positioned on a first side of the aperture (i.e., the left side in the −x direction) and a second cooling channel 422 is positioned on a second side (i.e., the right side in the +x direction) of the aperture 410 and the first cooling channel 421 is substantially parallel to the second cooling channel 422. As used herein, "substantially parallel" is used to mean parallel with acceptable manufacturing tolerances. In embodiments, it is desirable to position the first cooling channel 421 and the second cooling channel 422 in as close proximity as possible to the aperture 410 without compromising the structural integrity of the plate 142 and aperture 410. In FIG. 4 the first cooling channel 421 and the second cooling channel 422 are equidistant to the aperture 410; however, in embodiments, one of the first cooling channel 421 or the second cooling channel 422 may be positioned in closer proximity to the aperture 410 than the other cooling channel. In addition, and according to one or more embodiments, the first cooling channel 421 may not be positioned to be parallel to the second cooling channel 422**.

Figure 6:
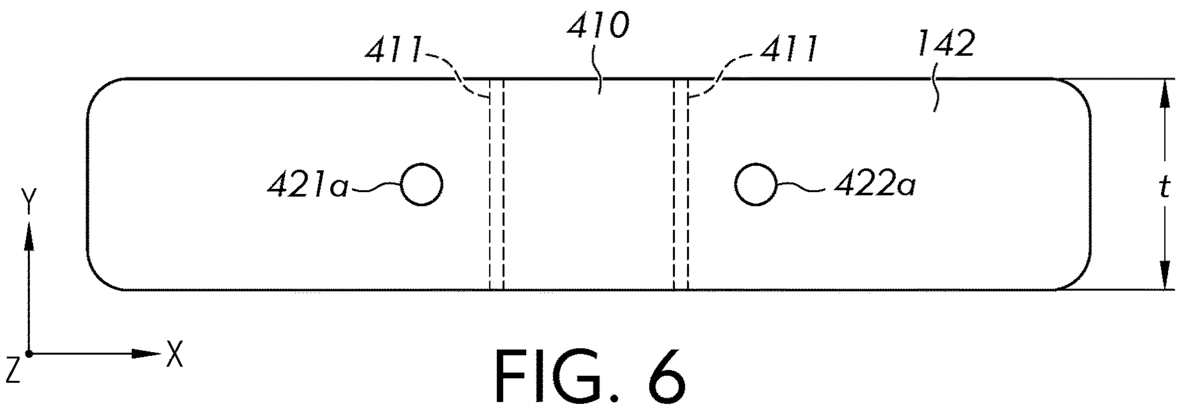
FIG. 6 schematically depicts the top view of a plate having two parallel cooling channels according to embodiments disclosed and described herein.

The cooling channels 421 and 422 may be machined into the plate 142 by drilling, laser or water beam ablation, or the like. With reference to FIG. 6, which depicts a top view of a plate 142, the cooling channels are machined into the thickness t of the plate 142. FIG. 6 shows the inlets **421*a* of the first cooling channel and 422*a* of the second cooling channel that run adjacent to the aperture 410 in the plate 142. By machining the cooling channels through the thickness of the plate 142 the integrity of the plate 142 is not compromised by seams or welding—which can cause weak points within the plate 142—traditionally present in plasma window plates. Plates without seams or welding are referred to herein as a "unitary plate." As mentioned above, the plasma window into which the plates 142 are positioned is subject to a significant pressure difference as a result of the plasma window separating the high-pressure side of the beam accelerator system and low-pressure side of the beam accelerator system. In addition, the unitary plates 142 are subject to high heat loads. The pressure differential and heat loads can cause any seams in the unitary plate 142** to fail. Accordingly, plates of one or more embodiments disclosed and described herein may comprise unitary plates. It should be understood that the use of the term "plate" within this disclosure may refer to a unitary plate or a non-unitary plate.

According to one or more embodiments, the cooling channels 421 and 422 have a circular cross-section (as shown in FIG. 6) and the diameters of the cooling channels 421 and 422 are sized according to the amount of cooling fluid throughput that is desired. In other embodiments, the cooling channels 421 and 422 may have a cross-section that is elliptical, square, rectangular, pentagonal, hexagonal, or octagonal. Of course, the cross-sectional dimensions, such as the diameter, of the cooling channels 421 and 422 is limited by the thickness t of the plate 142.

In embodiments, the interior surface of the cooling channels 421 and 422 may individually be smooth, allowing for relatively laminar flow of the cooling fluid from the inlets 421*a* and 422*a* of the cooling channels 421 and 422, respectively, positioned at a first side of the plate 142 to the outlets 421*b* and 422*b* of the cooling channels 421 and 422, respectively, positioned at a second side of the plate 142. However, in other embodiments, the interior of the cooling channels 421 and 422 may have a swirl design that causes turbulent flow of the cooling fluid from the inlets 421*a* and 422*a* of the cooling channels 421 and 422, respectively, positioned at a first side of the plate 142 to the outlets 421*b* and 422*b* of the cooling channels 421 and 422, respectively, positioned at a second end of the plate 142. The swirl design may be provided via a swirl-shaped insert present in the cooling channels 421 and 422 or by machining the cooling channels 421 and 422 to have an integral swirl design on their inner surfaces. The turbulent flow of the cooling fluid through the cooling channels 421 and 422 caused by the swirl-designed interior of the cooling channels 421 and 422 aids in the transfer of heat from the aperture 410 to the cooling fluid compared to cooling channels 421 and 422 having a smooth interior surface. However, cooling channels 421 and 422 having a smooth interior surface are easier to fabricate and have less of a pressure drop across the cooling channels 421 and 422. The cooling effect is primarily provided by cooling fluid flow rate and turbulence within the cooling channels 421 and 422. The higher the flow and the more turbulence within the cooling channels 421 and 422, the greater the cooling effect that will be provided. However, increased flow rate and turbulence within the cooling channels 421 and 422 causes a greater pressure drop. Therefore, the cooling effect and the pressure drop are balanced to achieve desired results.

Referring again to FIG. 4, providing cooling channels 421 and 422 on opposing sides of the aperture 410 provides good cooling of the aperture wall positioned directly between the aperture 410 and the cooling channels 421 and 422. However, portions of the aperture wall positioned along centerline 430 and not directly between the aperture 410 and the cooling channels 421 and 422 may, in one or more embodiments, not be sufficiently cooled by the cooling channel design shown in FIG. 4, even when the interior of the cooling channels 421 and 422 have a swirl design. That is, the farther the aperture wall is from a cooling channel, the less cooling effect that portion of the aperture wall will receive. Accordingly, additional embodiments of cooling channel designs that provide more uniform cooling of the aperture wall are provided herein.

Figure 7:
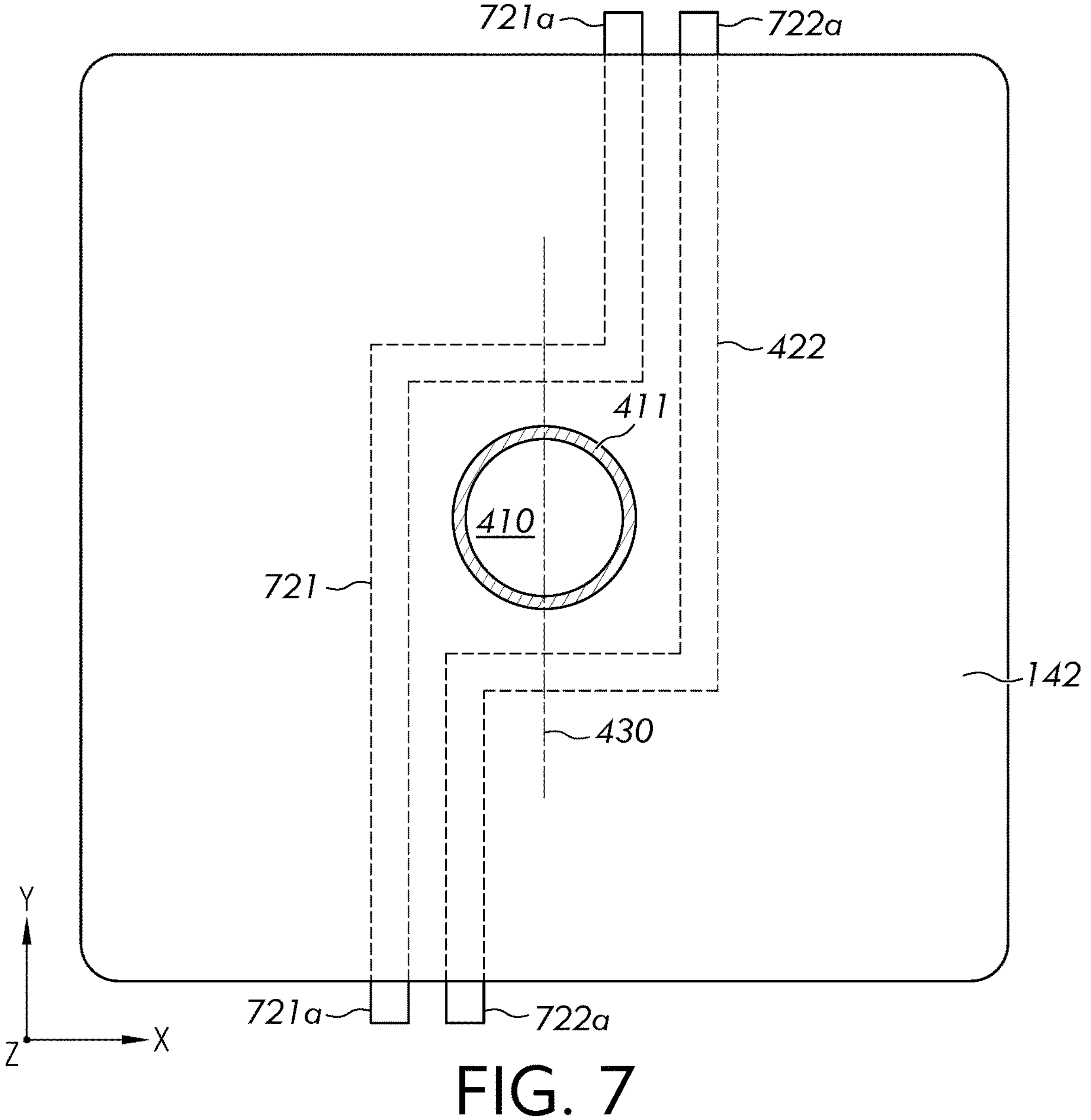
FIG. 7 schematically depicts a front view of a plate having an L-shaped cooling channel design according to embodiments disclosed and described herein.

FIG. 7 is a front view of a plate 142 having an L-shaped cooling channel design. The plate 142 comprises an aperture 410 having an annular inner surface made from refractory metal 411, as described above. The embodiment of the plate 142 as depicted in FIG. 7 comprises a first cooling channel 721 and a second cooling channel 722. Each of the first cooling channel 721 and the second cooling channel 722 have an "L" shape. The first cooling channel 721 is positioned to the left (i.e., left in the −x direction) of the second cooling channel 722.

At a first side (i.e., bottom in the −y direction) of the plate 142 and at the outlet 721*b* of the first cooling channel 721, the first cooling channel 721 is in a position to a first side (i.e., left in the −x direction) of the aperture 410 and extends upward (i.e., in the +y direction) in the plate 142 so that the first cooling channel 721 passes adjacent to the first side (i.e., left in the −x direction) of the aperture 410. When the first cooling channel 721 extends past the second side (i.e., top in the +y direction) of the aperture, the first cooling channel 721 turns in a first direction (i.e., right in the +x direction) and extends along the second side (i.e., top in the +y direction) of the aperture 410. When the first cooling channel 721 extends to the fourth side (i.e., right in the +x direction) of the aperture 410, the first cooling channel 721 turns in a second direction (i.e., upward in the +y direction) and extends toward the second end (i.e., top in the +y direction) of the plate 142 and at extends to inlet 721*a* of the first cooling channel 721. With the cooling channel design depicted in the embodiment of FIG. 7, the first cooling channel 721 provides cooling to the first side (i.e., left in the −x direction) of the aperture 410 and the second side (i.e., top in the +y direction) of the aperture 410.

At the first side (i.e., bottom in the −y direction) of the plate 142 and at the outlet 722*b* of the second cooling channel 722, the second cooling channel 722 is in a position between the centerline 430 of the aperture 410 and the first cooling channel 721. The second cooling channel 722 extends upward (i.e., in the +y direction) in the plate 142 toward the third side (i.e., bottom in the −y direction) of the aperture 410. When the second cooling channel 722 reaches the third side (i.e., bottom in the −y direction) of the aperture 410 it is near the first (i.e., left in the −x direction) side of the aperture 410 and turns in a first direction (i.e., right in the +x direction) to extend along the third side (i.e., bottom in the −y direction) of the aperture 410. When the second cooling channel 722 extend past the fourth side (i.e., right in the +x direction) of the aperture 410, the second cooling channel 722 turns in a second direction (i.e., upward in the +y direction) in the plate 142 and extends along the fourth side (i.e., right in the +x direction) of the aperture 410 until the second cooling channel 722 reaches the inlet 722*a* of the second cooling channel 722. With the cooling channel design depicted in the embodiment of FIG. 7, the second cooling channel 722 provides cooling to the third side (i.e., bottom in the −y direction) of the aperture 410 and the fourth side (i.e., right in the +x direction) of the aperture 410.

Figure 4:
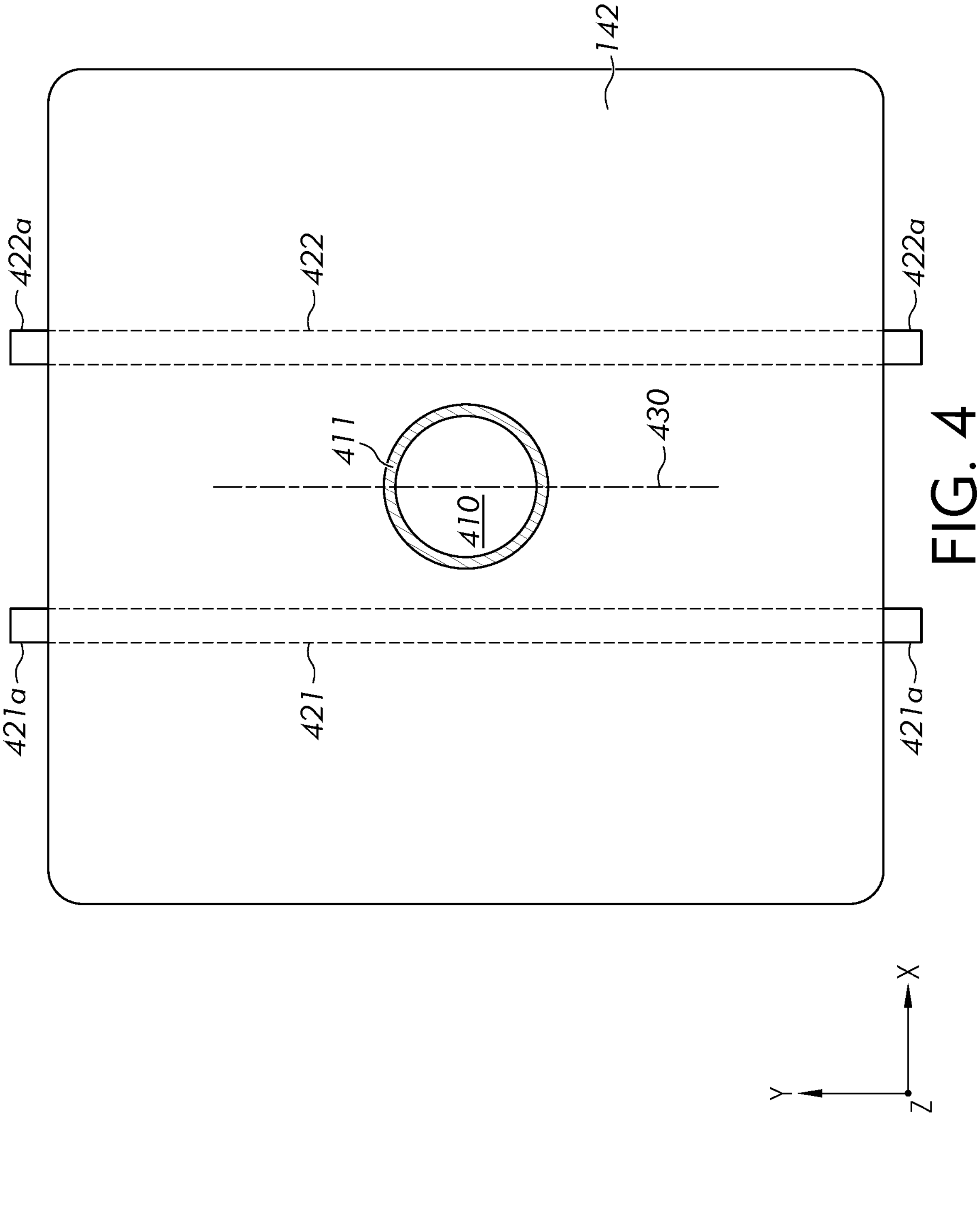
FIG. 4 schematically depicts a front view of a plate having two parallel cooling channels according to embodiments disclosed and described herein.

The cooling channel design of the embodiment depicted in FIG. 7 provides cooling on four sides of the aperture 410, as opposed to the embodiment depicted in FIG. 4 that provides cooling to two sides of the aperture.

Figure 8A:
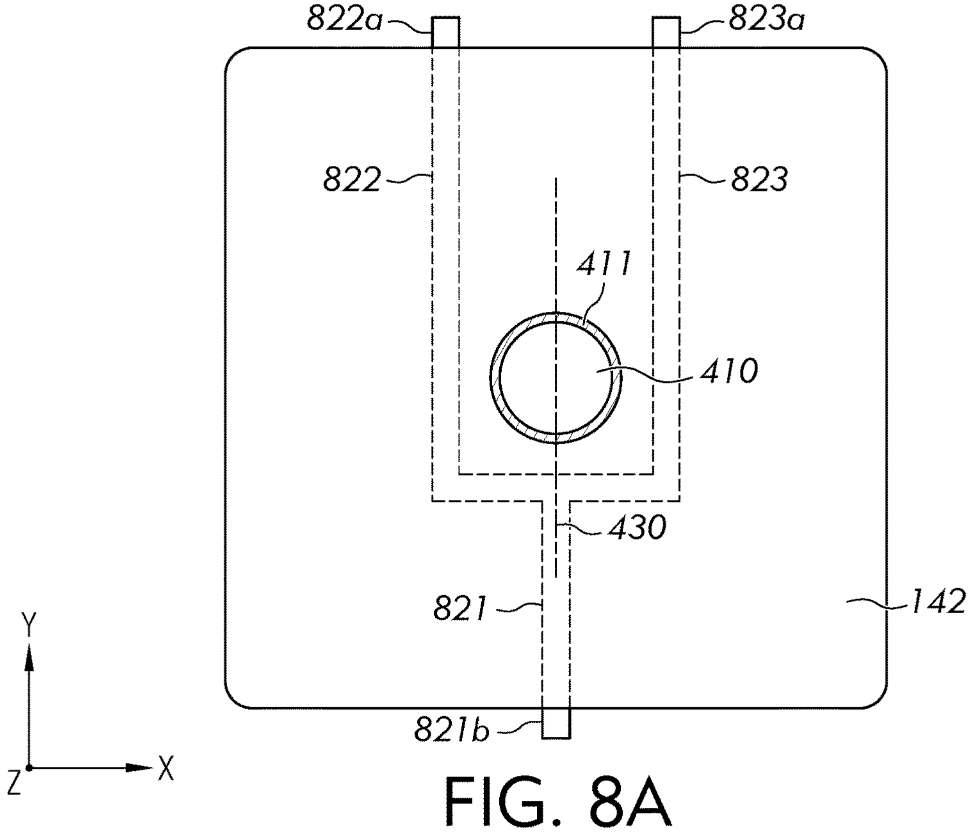
FIG. 8A schematically depicts a front view of a plate having an U-shaped cooling channel design according to embodiments disclosed and described herein.

FIG. 8A is a front view of a plate 142 having a U-shaped cooling channel design. The plate 142 comprises an aperture 410 having an annular inner surface made from refractory metal 411, as described above. The embodiment of the plate 142 as depicted in FIG. 8A comprises a first cooling channel 821 that splits into a second cooling channel 822 and a third cooling channel 823. The combination of the first cooling channel 821, the second cooling channel 822, and the third cooling channel 823 create a "U" shape.

At the first side (i.e., bottom in the −y direction) of the plate 142 and near the outlet 821*b* of the first cooling channel 821, the first cooling channel 821 enters the plate 142. In embodiments, the longitudinal axis of the first cooling channel 821 is positioned at about the centerline 430 that bisects a cross-section of the aperture 410. The first cooling channel 821 extends upward (i.e., in the +y direction) in the plate 142 toward the aperture 410. When the first cooling channel 821 reaches the first side (i.e., bottom in the −y direction) of the aperture 410, the first cooling channel 821 splits into the second cooling channel 822 and the third cooling channel 823. In embodiments, each of the second cooling channel 822 and the third cooling channel 823 are approximately perpendicular to the first cooling channel 821.

The second cooling channel 822 extends in a first direction (i.e., left in the −x direction) horizontally along the first side (i.e., bottom in the −y direction) of the aperture 410 toward a second side (i.e., left in the −x direction) of the aperture 410. When the second cooling channel 822 extends past the second side (i.e., left in the −x direction) of the aperture 410, the second cooling channel 822 turns in a second direction (i.e., upward in the +y direction) and extends along the second side (i.e., left the −x direction) of the aperture 410 toward the second side (i.e., top in the +y direction) of the plate 142, and toward the inlet 822*a* of the second cooling channel.

The third cooling channel 823 extends in a third direction (i.e., right in the +x direction) along the first side (i.e., bottom in the −y direction) of the aperture 410 to the third side (i.e., right in the +x direction) of the aperture 410. When the third cooling channel 823 extends past the third side (i.e., right in the +x direction) of the aperture, the third cooling channel 823 turns in the second direction (i.e., upward in the +y direction) and extends along the third side (i.e., right the +x direction) of the aperture 410 toward the second side (i.e., top in the +y direction) of the plate 142, and toward the second inlet 822*a*.

The U-shaped cooling channel design of the embodiment depicted in FIG. 8A provides cooling to three sides of the aperture 410 (i.e., the bottom of the aperture 410, the left side of the aperture 410, and the right side of the aperture 410). In embodiments, one or both plates 142 adjacent to the plate having the U-shaped cooling channel design of the embodiment depicted in FIG. 8A may have the same U-shaped cooling channel design as the plate of the embodiment depicted in FIG. 8A where two cooling channel inlets 822*a* and 823*a* are positioned at the second side (i.e., the top in the +y direction) of the plate 142 and the single cooling channel outlet 821*b* is positioned at the first side (i.e., bottom in the −y direction) of the plate 142. However, in embodiments, one or more plates 142 adjacent to the plate having the U-shaped cooling channel design of the embodiment depicted in FIG. 8A may have an inverted U-shaped cooling channel design where the two cooling channel inlets 822*a* and 823*a* are positioned at the first side (i.e., bottom in the −y direction) of the plate 142 and the singe cooling channel outlet 821*b* is positioned at the second side (i.e., top in the +y direction) of the plate 142.

Figure 8B:
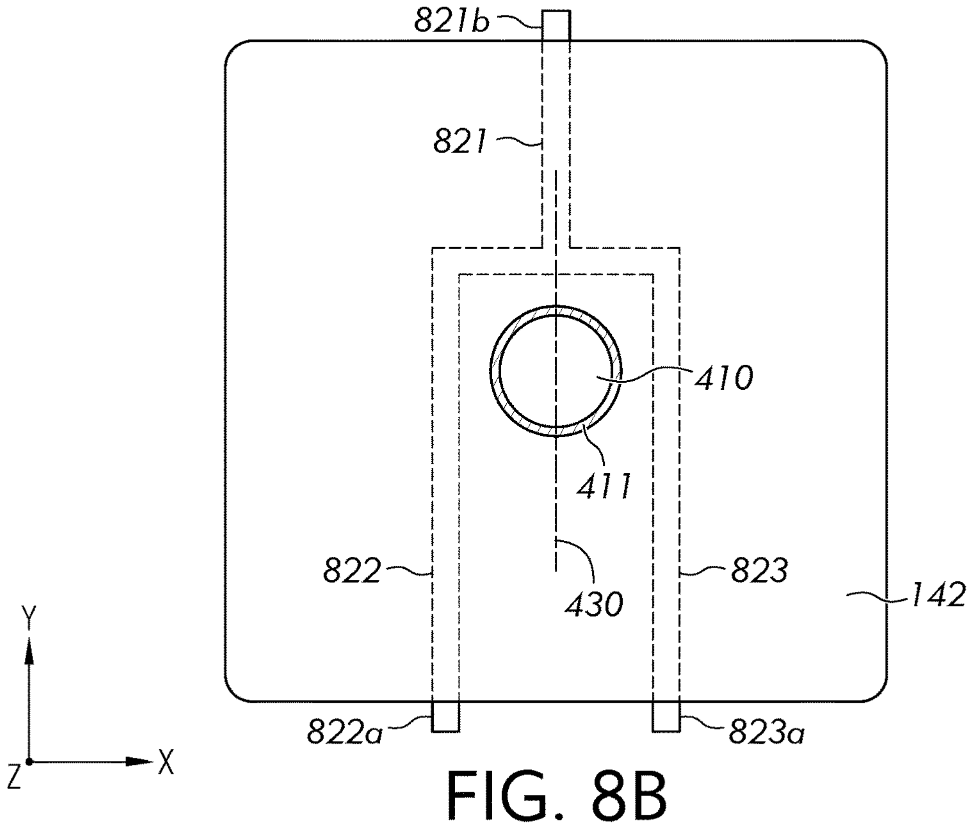
FIG. 8B schematically depicts a front view of a plate having an inverted U-shaped cooling channel design according to embodiments disclosed and described herein.

The inverted U-shape cooling channel design will now be described with reference to FIG. 8B. The plate 142 comprises an aperture 410 having an annular inner surface made from refractory metal 411, as described above. The embodiment of the plate 142 as depicted in FIG. 8B comprises a first cooling channel 821 that splits into a second cooling channel 822 and a third cooling channel 823. The combination of the first cooling channel 821, the second cooling channel 822, and the third cooling channel 823 create an inverted "U" shape.

At the top (i.e., upward in the +y direction) of the plate 142 and near the outlet 821*b* of the first cooling channel 821, the longitudinal axis of the first cooling channel 821 is positioned at about the centerline 430 that bisects a cross-section of the aperture 410. The first cooling channel 821 extends downward (i.e., downward in the −y direction) in the plate 142 toward the aperture 410. When the first cooling channel 821 reaches the fourth side (i.e., top in the +y direction) of the aperture 410, the first cooling channel 821 splits into the second cooling channel 822 and the third cooling channel 823.

The second cooling channel 822 extends in a first direction (i.e., left in the −x direction) along the fourth side (i.e., top in the +y direction) of the aperture 410 to the second side (i.e., left in the −x direction) of the aperture 410. When the second cooling channel 822 extends past the second side (i.e., left in the −x direction) of the aperture 410, the second cooling channel 822 turns in a second direction (i.e., downward in the −y direction) and extends along the second side (i.e., left in the −x direction) of the aperture 410 toward the first side (i.e., bottom in the −y direction) of the plate 142, and toward the inlet 822*a* of the second cooling channel 822.

The third cooling channel 823 extends in a third direction (i.e., right in the +x direction) along the fourth side (i.e., top in the +y direction) of the aperture 410 to the third side (i.e., right in the +x direction) of the aperture 410. When the third cooling channel 823 extends past the third side (i.e., right in the +x direction) of the aperture, the third cooling channel 823 turns in the second direction (i.e., downward in the −y direction) and extends along the third side (i.e., right in the +x direction) of the aperture 410 toward the first side (i.e., bottom in the −y direction) of the plate 142, and toward the inlet 823*a* of the third cooling channel.

The inverted U-shaped cooling channel design of the embodiment depicted in FIG. 8B provides cooling to three sides of the aperture 410 (i.e., the top of the aperture 410, the left side of the aperture 410, and the right side of the aperture 410). This inverted U-shaped cooling channel design may be used to compliment the U-shaped cooling channel design depicted in FIG. 8A so that the top of the aperture 410 is cooled in various plates 142 and the bottom of the aperture 410 is cooled in various plates 142. For example, and in one or more embodiments, plates having the U-shaped cooling channel design depicted in FIG. 8A may be alternated with plates having the inverted U-shaped cooling channel design depicted in FIG. 8B so that the top of the aperture is cooled in every other plate and the bottom of the aperture is cooled in every other plate.

Figure 9:
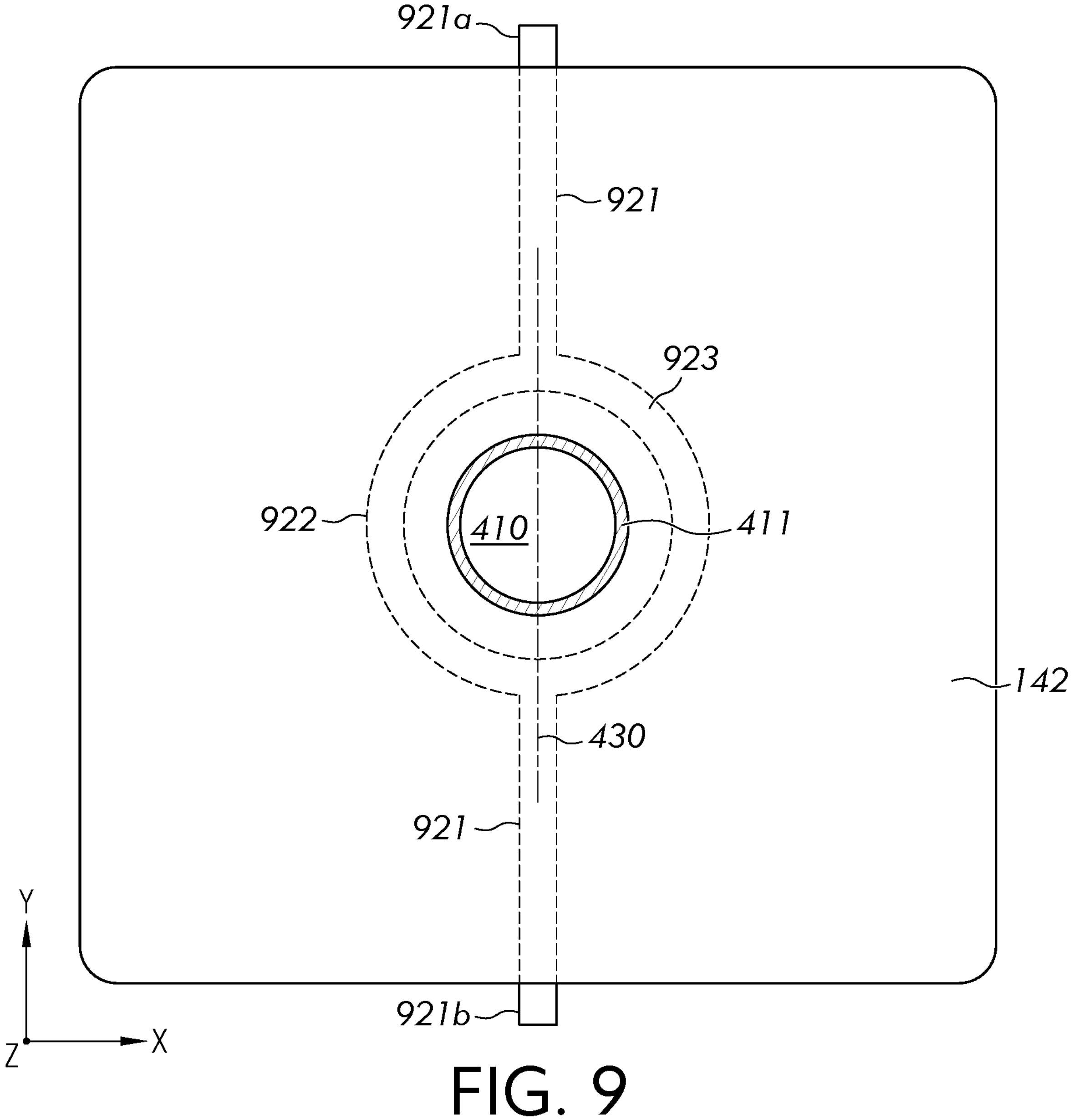
FIG. 9 schematically depicts a front view of a plate having an O-shaped cooling channel design according to embodiments disclosed and described herein.

FIG. 9 is a front view of a plate 142 having an O-shaped cooling channel design. The plate 142 comprises an aperture 410 having an annular inner surface made from refractory metal 411, as described above. The embodiment of the plate 142 as depicted in FIG. 9 comprises a first portion of a first cooling channel 921 that splits into a second cooling channel 922 and a third cooling channel 923 at a first side of the aperture 410. The second cooling channel 922 extends around a first portion of the aperture 410 and the third cooling channel extends around a second portion of the aperture 410. The second cooling channel 922 and the third cooling channel 923 come back together as a second portion of the first cooling channel 921 at a second side of the aperture 410. The combination of the second cooling channel 922, and the third cooling channel 923 create an annular "O" shaped cooling channel around the aperture 410.

At a first side (i.e., bottom in the −y direction) of the plate 142 and at the outlet 921*b* of the first cooling channel 921, the longitudinal axis of the first cooling channel 921 is positioned approximately at the centerline 430 that bisects the cross-section of the aperture 410. A first portion of the first cooling channel 921 extends upward (i.e., in the +y direction) in the plate 142 toward the aperture 410. When the first cooling channel 921 reaches a first side (i.e., bottom in the −y direction) of the aperture 410, the first cooling channel 921 splits into a second cooling channel 922 and a third cooling channel 923. The second cooling channel 922 extends in an annular shape adjacent to a second side (i.e., left in the −x direction) of the aperture 410 and mimics the shape of the aperture 410. The third cooling channel 923 extends in an annular shape adjacent to a second side (i.e., right in the +x direction) of the aperture 410 and mimics the shape of the aperture 410. Near a third side (i.e., top in the +y direction) of the aperture 410, the second cooling channel 922 and the third cooling channel 923 combine to form a second portion of the first cooling channel 921 that extends upward (i.e., in the +y direction) toward a second side (i.e., top in the +y direction) of the plate 142 and cooling channel inlet 921*a*.

The O-shaped cooling channel design of the embodiment depicted in FIG. 9 provides cooling to all sides of the aperture 410 by having an annular-shaped second cooling channel 922 extending around the left side of the aperture 410 and having an annular-shaped third cooling channel 923 extending around the right side of the aperture 410.

In any of the embodiments disclosed and described herein, the at least a portion of at least one cooling channel is offset from the aperture by less than 15.0 mm, such as less than 10.0 mm, less than 8.0 mm, less than 6.0 mm, or less than 5.0 mm. Accordingly, in embodiments, at least a portion of at least one cooling channel is offset from the aperture by 0.5 mm to 15.0 mm, 5.0 mm to 15.0 mm, 10.0 mm to 15.0 mm, 0.5 mm to 10.0 mm, 5.0 mm to 10.0 mm, or 0.5 mm to 5.0 mm.

In any of the embodiments disclosed and described herein, the cooling channels may have a cross-sectional diameter that is greater than or equal to 0.5 mm and less than or equal to 5.0 mm, greater than or equal to 1.0 mm and less than or equal to 5.0 mm, greater than or equal to 2.5 mm and less than or equal to 5.0 mm, greater than or equal to 4.0 mm and less than or equal to 5.0 mm, greater than or equal to 0.5 mm and less than or equal to 3.0 mm, greater than or equal to 1.0 mm and less than or equal to 3.0 mm, or greater than or equal to 0.5 mm and less than or equal to 2.0 mm.

It should be understood that the plasma window 140 may be cooled using any of the embodiments described herein. Indeed, operation of the beam accelerator system 100 may comprise generating the viscous plasma 310 in the plasma channel 141. The viscous plasma 310 may by generated by applying a voltage to a target gas (which is housed in the target chamber 160 and the cathode target region 153 and may comprise deuterium, tritium, argon, or helium) thereby heating and ionizing a portion of the target gas to form the viscous plasma 310. In some embodiments, the input voltage is applied by the cathodes 151. In other embodiments, the input voltage is applied by one or more initiating coils, such as tesla coils, which may be mounted on one or more of the plates 142. The method next comprises directing the ion beam 111, which is generated by the ion accelerator 110, from the low-pressure chamber 120 through the viscous plasma 130 disposed in the plasma channel 141 of the plasma window 140 and into the target chamber 160. In the target chamber 160, the ion beam 111 interacts with the target gas to produce neutron via a fusion reaction. The method also including cooling the plasma window 140, specifically the plates 142 of the plasma window 140, which are heated by the viscous plasma 310 in the plasma channel 141. As described above with respect to FIGS. 4-9, the plates 142 may be cooled by directing the cooling fluid through one or more cooling channels, transferring heat from the aperture 410 and the plates 142 to the cooling fluid, cooling the aperture 410 and the plates 142.

As used herein, terms such as "substantially," "approximately," and the like refer to the subsequently listed property or measurement within normal manufacturing tolerances and imperfections in the relevant field.

A first aspect includes a beam accelerator system operable to produce a medical isotope, the beam accelerator system comprising: an ion accelerator that generates a high-energy ion beam; a low-pressure chamber; an anode adjacent and fluidly connected to the low-pressure chamber; a plasma window adjacent and fluidly connected to the anode; and a cathode housing adjacent and fluidly connected to the plasma window, wherein the plasma window comprises a plurality of plates, each plate comprises an aperture that is aligned with an aperture in one or more adjacent plates to form a plasma channel, and one or more plates in the plurality of plates comprises: a unitary plate having an aperture therein; and one or more cooling channels entering the unitary plate at a first side of the unitary plate and exiting the unitary plate at a second side of the unitary plate, wherein the one or more cooling channels run through a thickness of the unitary plate.

A second aspect includes the beam accelerator system of the first aspect, wherein the one or more cooling channels comprises a first cooling channel and a second cooling channel, wherein the first cooling channel is substantially parallel to the second cooling channel, and the first cooling channel is positioned on a first side of the aperture and the second cooling channel is positioned on a second side of the aperture.

A third aspect includes the beam accelerator system of the second aspect, wherein at least one of the first cooling channel and the second cooling channel have a smooth interior surface.

A fourth aspect includes the beam accelerator system of the second aspect, wherein at least one of the first cooling channel and the second cooling channel have a swirl design on an interior surface.

A fifth aspect includes the beam accelerator system of the second to fourth aspects, wherein the first cooling channel and the second cooling channel have a cross-sectional area that is circular.

A sixth aspect includes the beam accelerator system of the first to fifth aspects, wherein the plurality of plates are formed from a thermally conductive metal selected from the group consisting of copper, silver, aluminum, and tungsten.

A seventh aspect includes the beam accelerator system of the first to sixth aspects, wherein an inner wall of the aperture is formed from a refractory metal.

An eighth aspect includes the beam accelerator system of the first to seventh aspects, wherein the aperture has a diameter that is from 1.0 mm to 10.0 mm.

A ninth aspect includes the beam accelerator system of the first to eighth aspects, wherein at least one point of the one or more cooling channels is offset from the aperture by less than 15.0 mm.

A tenth aspect includes the beam accelerator system of the first to ninth aspects, wherein a diameter of the one or more cooling channels is greater than or equal to 0.5 mm and less than or equal to 5.0 mm.

An eleventh aspect includes a beam accelerator system operable to produce a medical isotope, the beam accelerator system comprising: an ion accelerator that generates a high-energy ion beam; a low-pressure chamber; an anode adjacent and fluidly connected to the low-pressure chamber; a plasma window adjacent and fluidly connected to the anode; and a cathode housing adjacent and fluidly connected to the plasma window, wherein the plasma window comprises a plurality of plates, each plate comprises an aperture that is aligned with an aperture in one or more adjacent plates to form a plasma channel, and one or more plates in the plurality of plates comprises: a first cooling channel and a second cooling channel that run through a thickness of the one or more plates and enters the one or more plates at a first side of the one or more plates and exits the one or more plates at a second side of the one or more plates, wherein the first cooling channel enters the one or more plates at the first side of the one or more plate, extends adjacent to a first side of the aperture, turns in a first direction to extend adjacent to a second side of the aperture, turns in a second direction and extends to exit the one or more plates at a second side of the one or more plate, and the second cooling channel enters the one or more plates at a first side of the one or more plates and extends to a third side of the aperture, turns in the first direction to extend adjacent to the third side of the aperture, turns in the second direction to extend adjacent to a fourth side of the aperture, and exits on the second side of the one or more plate.

A twelfth aspect includes a beam accelerator system according to the eleventh aspect, wherein a longitudinal axis of the first cooling channel is positioned along a centerline that bisects a cross-section of the aperture.

A thirteenth aspect includes a beam accelerator system according to the eleventh and twelfth aspects, wherein the plurality of plates are formed from a thermally conductive metal selected from the group consisting of copper, silver, aluminum, and tungsten.

A fourteenth aspect includes a beam accelerator system according to the eleventh to thirteenth aspects, wherein an inner wall of the aperture is formed from a refractory metal.

A fifteenth aspect includes a beam accelerator system according to the eleventh to fourteenth aspects, wherein the aperture has a diameter that is from 1.0 mm to 10.0 mm.

A sixteenth aspect includes a beam accelerator system according to the eleventh to fifteenth aspects, wherein at least one point of the one or more cooling channels is offset from the aperture by less than 15.0 mm.

A seventeenth aspect includes a beam accelerator system according to the eleventh to sixteenth aspects, wherein a diameter of the one or more cooling channels is greater than or equal to 0.5 mm and less than or equal to 5.0 mm.

An eighteenth aspect includes a beam accelerator system operable to produce a medical isotope, the beam accelerator system comprising: an ion accelerator that generates a high-energy ion beam; a low-pressure chamber; an anode adjacent and fluidly connected to the low-pressure chamber; a plasma window adjacent and fluidly connected to the anode; and a cathode housing adjacent and fluidly connected to the plasma window, wherein the plasma window comprises a plurality of plates, each plate comprises an aperture that is aligned with an aperture in one or more adjacent plates to form a plasma channel, and one or more plates in the plurality of plates comprise a first cooling channel, a second cooling channel, and a third cooling channel that run through a thickness of the one or more plates, wherein the first cooling channel enters the one or more plates at a first side of the one or more plate, extends to a first side of the aperture and splits into the second cooling channel and the third cooling channel, the second cooling channel, extends in a first direction adjacent to the first side of the aperture to a second side of the aperture, turns in a second direction and extends adjacent to the second side of the aperture and exits the one or more plates at a second side of the one or more plate, and the third cooling channel extends in a third direction adjacent to the first side of the aperture to a third side of the aperture, turns in the second direction and extends adjacent to the third side of the aperture and exits the one or more plates at the second side of the one or more plate.

A nineteenth aspect includes a beam accelerator system according to the eighteenth aspect, wherein the first direction and the third direction are approximately perpendicular to the first cooling channel.

A twentieth aspect includes a beam accelerator system according to the eighteenth or nineteenth aspects, wherein the second direction is approximately parallel to the first direction.

A twenty-first aspect includes a beam accelerator system according to the eighteenth to twentieth aspects, wherein the plurality of plates are formed from a thermally conductive metal selected from the group consisting of copper, silver, aluminum, and tungsten.

A twenty-second aspect includes a beam accelerator system according to the eighteenth to twenty-first aspects, wherein an inner wall of the aperture is formed from a refractory metal.

A twenty-third aspect includes a beam accelerator system according to the eighteenth to twenty-second aspects, wherein the aperture has a diameter that is from 1.0 mm to 10.0 mm.

A twenty-fourth aspect includes a beam accelerator system according to the eighteenth to twenty-third aspects, wherein at least one point of the one or more cooling channels is offset from the aperture by less than 15.0 mm.

A twenty-fifth aspect includes a beam accelerator system according to the eighteenth to twenty-fourth aspects, wherein a diameter of the one or more cooling channels is greater than or equal to 0.5 mm and less than or equal to 5.0 mm.

A twenty-sixth aspect includes a beam accelerator system operable to produce a medical isotope, the beam accelerator system comprising: an ion accelerator that generates a high-energy ion beam; a low-pressure chamber; an anode adjacent and fluidly connected to the low-pressure chamber; a plasma window adjacent and fluidly connected to the anode; and a cathode housing adjacent and fluidly connected to the plasma window, wherein the plasma window comprises a plurality of plates, each plate comprises an aperture that is aligned with an aperture in one or more adjacent plates to form a plasma channel, and one or more plates in the plurality of plates comprises: a first portion of a first cooling channel, a second cooling channel, a third cooling channel, and a second portion of the first cooling channel, wherein the first portion of a first cooling channel enters the plate at a first side of the plate, extends to a first side of the aperture, and splits into the second cooling channel and the third cooling channel, the second cooling channel extends around a first portion of the aperture, the third cooling channel extends around a second portion of the aperture, the second cooling channel and the third cooling channel combine at a second side of the aperture to form the second portion of the first cooling channel, the second portion of the first cooling channel exits the plate at a second side of the plate, and the second cooling channel and the third cooling channel form an annular cooling channel around the aperture.

A twenty-seventh aspect includes a beam accelerator system according to the twenty-sixth aspect, wherein the plurality of plates are formed from a thermally conductive metal selected from the group consisting of copper, silver, aluminum, and tungsten.

A twenty-eighth aspect includes a beam accelerator system according to the twenty-sixth to twenty-seventh aspects, wherein an inner wall of the aperture is formed from a refractory metal.

A twenty-ninth aspect includes a beam accelerator system according to the twenty-sixth to twenty-eighth aspects, wherein the aperture has a diameter that is from 1.0 mm to 10.0 mm.

A thirtieth aspect includes a beam accelerator system according to the twenty-sixth to twenty-ninth aspects, wherein at least one point of the one or more cooling channels is offset from the aperture by less than 15.0 mm.

A thirty-first aspect includes a beam accelerator system according to the twenty-sixth to thirtieth aspects, wherein a diameter of the one or more cooling channels is greater than or equal to 0.5 mm and less than or equal to 5.0 mm.

EXAMPLES

Embodiments will be further clarified by the following examples.

The Examples provided below were modeled using COMSOL software.

Example 1

A plate having a cooling channel design as shown in FIG. 4 was modeled where the aperture diameter was set to 10 mm; the aperture power was set to 1 kW/cm$^2$; the cooling channel diameter was set to 3 mm; the cooling channel was offset from the aperture by 9.525 mm; and the cooling fluid was set to be water with an inlet temperature of 20° C.

Figure 10A:
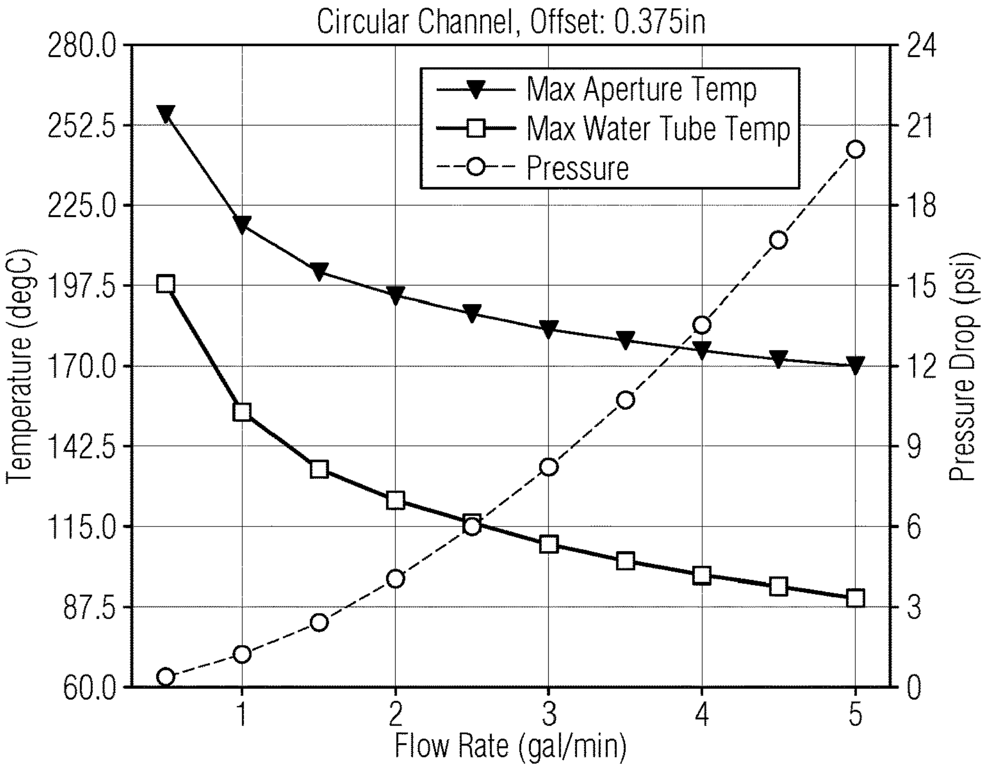
FIG. 10A graphically depicts temperature and pressure drop versus flow rate of for a plate having two parallel cooling channels with smooth interiors according to embodiments disclosed and described herein.

The above simulation was conducted where the cooling channels had a circular cross-sectional shape and a smooth interior and the simulation was conducted again under the same conditions, but where the interior of the channels had a circular cross-sectional shape and a swirl design on the interior of the cooling channel. FIG. 10A shows the results of the simulation where the cooling channels had a smooth interior and FIG. 10B shows the results of the simulation where the cooling channels had a swirl design on the interior.

The graph in FIG. 10A provides the temperature (° C.) on the left y-axis versus flow (gal/min) of cooling water on the x-axis for the maximum aperture temperature and the maximum cooling channel temperature. The graph in FIG. 10A provides the pressure drop (psi) in the cooling channels on the right y-axis versus flow (gal/min) of cooling water on the x-axis. As shown in FIG. 10A the pressure drop starts to increase rapidly at flow rates between 2.5 gal/min and 3.0 gal/min, while the aperture temperature and the cooling channel temperature level off around flow rates between 2.5 gal/min and 3.0 gal/min.

Figure 10B:
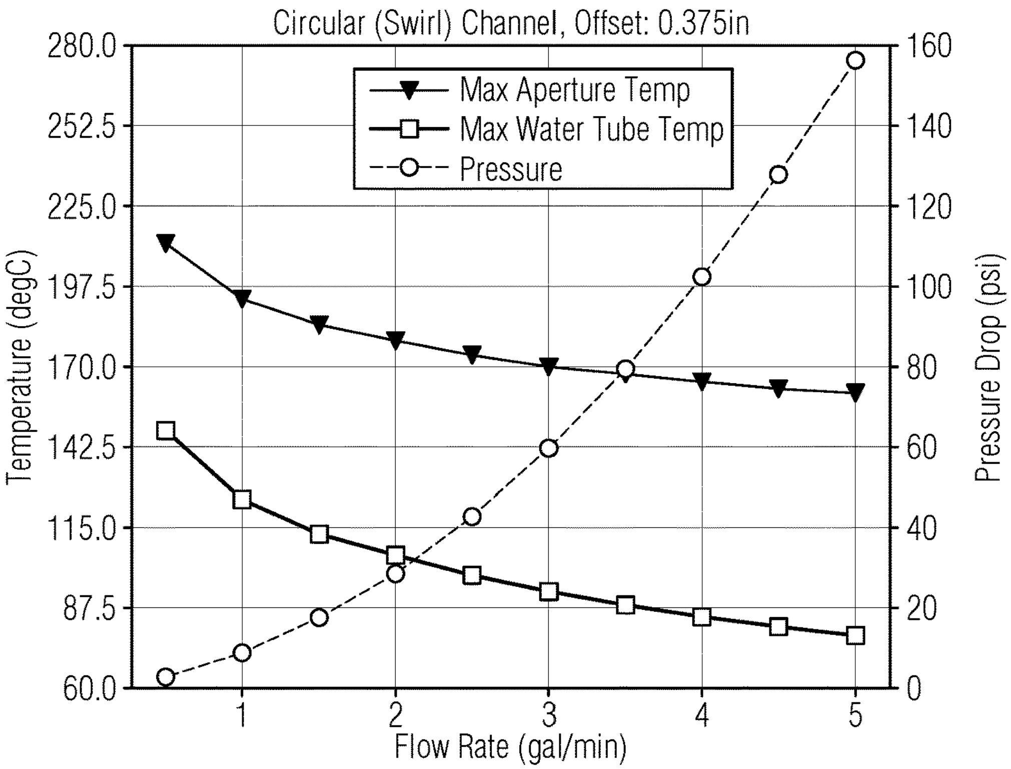
FIG. 10B graphically depicts temperature and pressure drop versus flow rate of for a plate having two parallel cooling channels with swirl designed interiors according to embodiments disclosed and described herein.

The graph in FIG. 10B provides the temperature (° C.) on the left y-axis versus flow (gal/min) of cooling water on the x-axis for the maximum aperture temperature and the maximum cooling channel temperature. The graph in FIG. 10B provides the pressure drop (psi) in the cooling channels on the right y-axis versus flow (gal/min) of cooling water on the x-axis. As shown in FIG. 10B the pressure drop starts to increase rapidly at flow rates between 2.5 gal/min and 3.0 gal/min, while the aperture temperature and the cooling channel temperature level off around flow rates between 2.5 gal/min and 3.0 gal/min.

A comparison of FIG. 10A and FIG. 10B shows that the temperatures of the aperture and the cooling channel are lower at lower cooling fluid flow rates in the cooling channels with a swirl design interior (shown in FIG. 10B) than cooling channels with smooth interior (shown in FIG. 10A). However, the pressure drop increases much more rapidly in the cooling channel design having a swirl design in the interior of the cooling channel (shown in FIG. 10B) compared to the cooling channel design with a smooth interior of the cooling channel (shown in FIG. 10A).

Example 2

A plate having L-shaped channel design as shown in FIG. 7 was modeled where the aperture diameter was set to 10 mm; the aperture power was set to 1 kW/cm$^2$; the cooling channel diameter was set to 3 mm; the cooling channel was offset from the aperture by 9.525 mm; and the cooling fluid was set to water with an inlet temperature of 20° C. The interior of the cooling channels had a circular cross-sectional shape and smooth interior surface.

Figure 11:
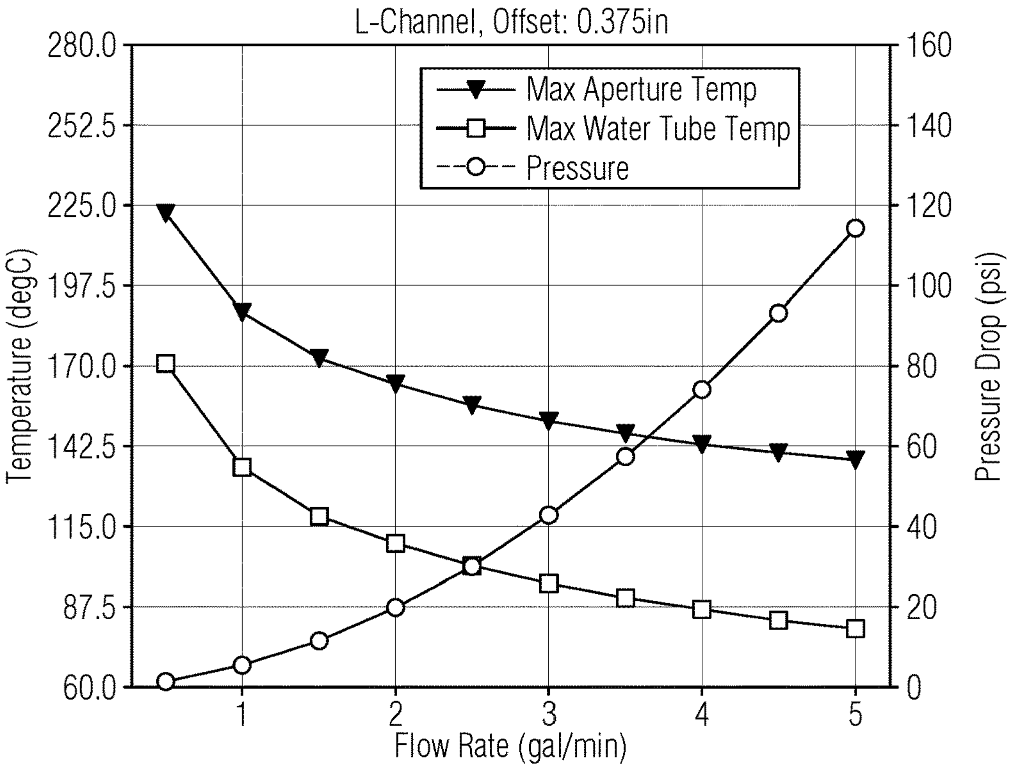
FIG. 11 graphically depicts temperature and pressure drop versus flow rate for a plate having an L-shaped cooling channel design according to embodiments disclosed and described herein.

The graph in FIG. 11 provides the temperature (° C.) on the left y-axis versus flow (gal/min) of cooling water on the x-axis for the maximum aperture temperature and the maximum cooling channel temperature. The graph in FIG. 11 provides the pressure drop (psi) in the cooling channels on the right y-axis versus flow (gal/min) of cooling water on the x-axis. As shown in FIG. 11 the pressure drop starts to increase rapidly at flow rates between 2.5 gal/min and 3.0 gal/min, while the aperture temperature and cooling channel temperature level off around flow rates between 2.5 gal/min and 3.0 gal/min.

As shown in a comparison of FIG. 10B and FIG. 11, the L-shaped channel design trades peak aperture temperature for peak cooling channel temperature. The L-shaped channel design has a much higher pressure drop than the cooling channel design in Example 1 with a smooth cooling channel interior (~95 psi), but the L-shaped cooling channel design does not have as much of a pressure drop as the cooling channel design of Example 1 having a swirl design cooling channel interior (~40 psi). The L-shaped channel design also has a 10-kW maximum dissipation per plate. Therefore, the L-shaped channel design results in an aperture temperature that is similar to that of the design in Example 1 with a swirl design cooling channel interior, but the L-shaped cooling channel design has less pressure drop.

Example 3

Simulations were conducted for the following cooling channel designs:

- the cooling channel design in FIG. 4, but where the cooling channels had a square cross-sectional shape and a smooth interior surface; and
- the U-shaped cooling channel design shown in FIG. 8A where the cooling channels had a circular cross sectional shape and a smooth interior surface.

In each of the above designs, the aperture diameter was set to 10 mm; the aperture power was set to 1 kW/cm$^2$; the cooling channel diameter was set to 3 mm; the cooling channel was offset from the aperture by 9.525 mm; and the cooling fluid was set to water with an inlet temperature of 20° C.

Figure 12:
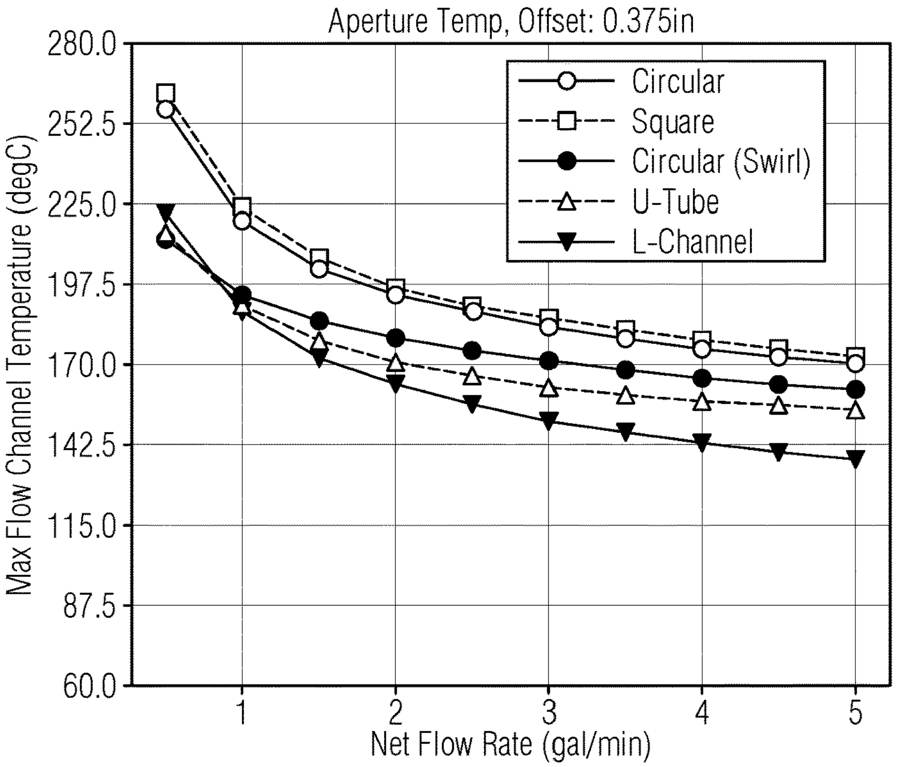
FIG. 12 graphically depicts aperture temperature versus flow rate for plates with cooling channel designs according to embodiments disclosed and described herein.
Figure 13:
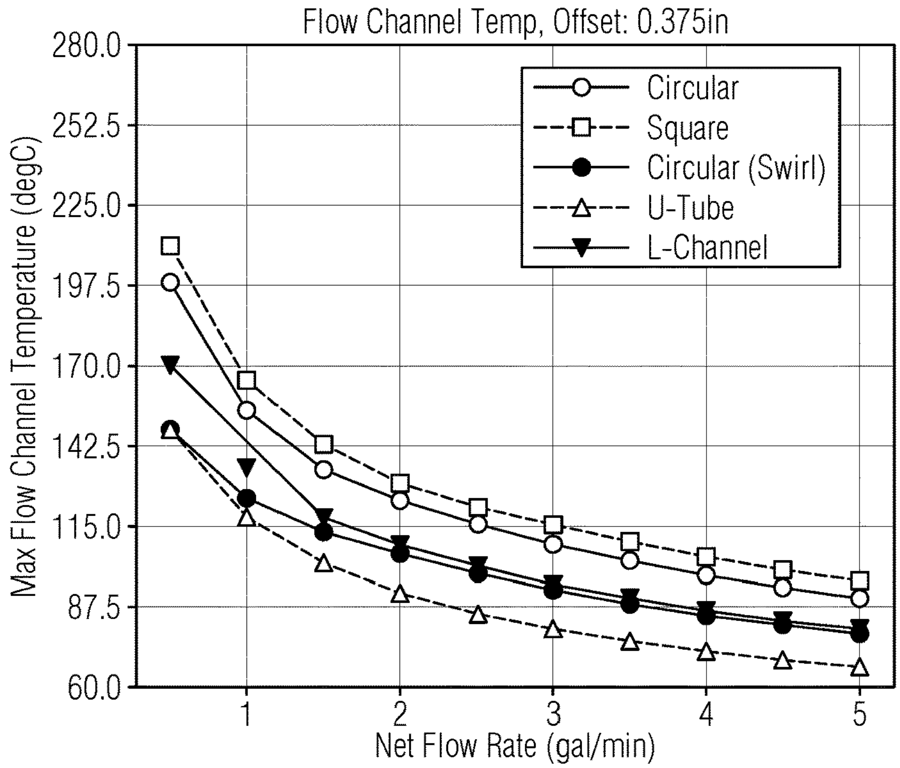
FIG. 13 graphically depicts cooling channel temperature versus flow rate for plates with cooling channel designs according to embodiments disclosed and described herein.
Figure 14:
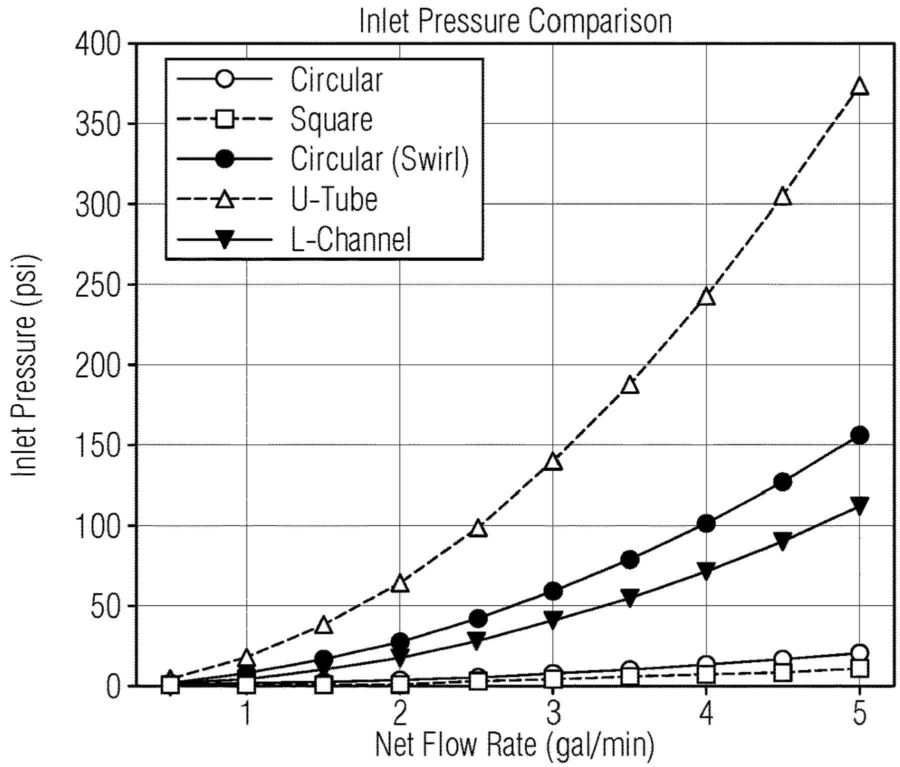
FIG. 14 graphically depicts cooling channel pressure drop versus flow rate for plates with cooling channel designs according to embodiments disclosed and described herein.

FIGS. 12-14 graphically depict the results of the above simulations as well as the simulations of Example 1 and Example 2. In FIGS. 12-14 the cooling channel design of Example 1 with a smooth interior is indicated as "Circular", the cooling channel design with square cross-sectional shape is indicated as "Square", the cooling channel design of Example 1 with a swirl design interior is indicated as "Circular (Swirl)", the U-shaped cooling channel design is indicated as "U-tube", and the L-shaped cooling channel design of Example 2 is indicated as "L-Channel".

FIG. 12 graphically depicts the max aperture temperature (° C.) along the y-axis versus flow rate (gal/min) along the x-axis. FIG. 13 graphically depicts the max cooling channel temperature along the y-axis versus flow rate (gal/min) along the x-axis. FIG. 14 graphically depicts the inlet pressure (psi) along the y-axis versus flow rate (gal/min) along the x-axis.

The circular cross-sectional shaped channels with a smooth interior and the square cross-sectional shaped cooling channels result in the highest temperatures in both the aperture and the cooling channel but have a small impact on pressure. The circular cross-sectional shaped cooling channel with a swirl design interior and the U-shaped cooling channel design facilitate the lowest temperatures of both aperture and cooling channel but each has a large "cost" in pressure drop. The L-shaped cooling channel design provides a middle ground where pressure drop is not as significant as the circular cross-sectional shaped cooling channel with a swirl design interior and the U-shaped cooling channel design, but L-shaped cooling channel design provides lower peak temperatures at both the aperture and cooling channel than the circular cross-sectional shaped cooling channel with a swirl design interior and the U-shaped cooling channel design.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A beam accelerator system operable to produce a medical isotope, the beam accelerator system comprising:
- an ion accelerator that generates a high-energy ion beam;
- a low-pressure chamber;
- an anode adjacent and fluidly connected to the low-pressure chamber;
- a plasma window adjacent and fluidly connected to the anode; and
- a cathode housing adjacent and fluidly connected to the plasma window, wherein
- the plasma window comprises a plurality of plates, each plate comprises an aperture that is aligned with an aperture in one or more adjacent plate to form a plasma channel, and
- one or more plate in the plurality of plates comprises:
  - a unitary plate having an aperture therein; and
  - one or more cooling channels entering the unitary plate at a first side of the unitary plate and exiting the unitary plate at a second side of the unitary plate,
  - wherein the one or more cooling channels run through a thickness of the unitary plate.

2. The beam accelerator system of claim 1, wherein the one or more cooling channels comprises a first cooling channel and a second cooling channel, wherein
- the first cooling channel is substantially parallel to the second cooling channel, and
- the first cooling channel is positioned on a first side of the aperture and the second cooling channel is positioned on a second side of the aperture.

3. The beam accelerator system of claim 2, wherein at least one of the first cooling channel and the second cooling channel have a smooth interior surface.

4. The beam accelerator system of claim 2, wherein at least one of the first cooling channel and the second cooling channel have a swirl design on an interior surface.

5. The beam accelerator system of claim 2, wherein the first cooling channel and the second cooling channel have a cross-sectional area that is circular.

6. The beam accelerator system of claim 1, wherein the plurality of plates are formed from a thermally conductive metal selected from the group consisting of copper, silver, aluminum, and tungsten.

7. The beam accelerator system of claim 1, wherein an inner wall of the aperture is formed from a refractory metal.

8. The beam accelerator system of claim 1, wherein the aperture has a diameter that is from 1.0 mm to 10.0 mm.

9. The beam accelerator system of claim 1, wherein at least one point of the one or more cooling channels is offset from the aperture by less than 15.0 mm.

10. The beam accelerator system of claim 1, wherein a diameter of the one or more cooling channels is greater than or equal to 0.5 mm and less than or equal to 5.0 mm.

11. A beam accelerator system operable to produce a medical isotope, the beam accelerator system comprising:
- an ion accelerator that generates a high-energy ion beam;
- a low-pressure chamber;
- an anode adjacent and fluidly connected to the low-pressure chamber;
- a plasma window adjacent and fluidly connected to the anode; and
- a cathode housing adjacent and fluidly connected to the plasma window, wherein
- the plasma window comprises a plurality of plates, each plate comprises an aperture that is aligned with an aperture in one or more adjacent plate to form a plasma channel, and
- one or more plate in the plurality of plates comprises:
  - a first cooling channel and a second cooling channel that run through a thickness of the one or more plate and enters the one or more plate at a first side of the one or more plate and exits the one or more plate at a second side of the plate, wherein
    - the first cooling channel enters the one or more plate at the first side of the one or more plate, extends adjacent to a first side of the aperture, turns in a first direction to extend adjacent to a second side of the aperture, turns in a second direction and extends to exit the one or more plate at a second side of the one or more plate, and
    - the second cooling channel enters the one or more plate at a first side of the one or more plate and extends to a third side of the aperture, turns in the first direction to extend adjacent to the third side of the aperture, turns in the second direction to extend adjacent to a fourth side of the aperture, and exits on the second side of the one or more plate.

12. The beam accelerator system of claim 11, wherein a longitudinal axis of the first cooling channel is positioned along a centerline that bisects a cross-section of the aperture.

13. The beam accelerator system of claim 11, wherein the plurality of plates are formed from a thermally conductive metal selected from the group consisting of copper, silver, aluminum, and tungsten.

14. The beam accelerator system of claim 11, wherein an inner wall of the aperture is formed from a refractory metal.

15. The beam accelerator system of claim 11, wherein the aperture has a diameter that is from 1.0 mm to 10.0 mm.

16. The beam accelerator system of claim 11, wherein at least one point of the first cooling channel or second cooling channel is offset from the aperture by less than 15.0 mm.

17. The beam accelerator system of claim 11, wherein a diameter of at least one of the first cooling channel and the second cooling channel is greater than or equal to 0.5 mm and less than or equal to 5.0 mm.

18. A beam accelerator system operable to produce a medical isotope, the beam accelerator system comprising:

an ion accelerator that generates a high-energy ion beam;

a low-pressure chamber;

an anode adjacent and fluidly connected to the low-pressure chamber;

a plasma window adjacent and fluidly connected to the anode; and a cathode housing adjacent and fluidly connected to the plasma window, wherein the plasma window comprises a plurality of plates, each plate comprises an aperture that is aligned with an aperture in one or more adjacent plate to form a plasma channel, and one or more plate in the plurality of plates comprises:

one or more cooling channels comprises a first cooling channel, a second cooling channel, and a third cooling channel that run through a thickness of the one or more plate, wherein the first cooling channel enters the one or more plate at a first side of the one or more plate, extends to a first side of the aperture and splits into the second cooling channel and the third cooling channel, the second cooling channel, extends in a first direction adjacent to the first side of the aperture to a second side of the aperture, turns in a second direction and extends adjacent to the second side of the aperture and exits the one or more plate at a second side of the one or more plate, and the third cooling channel extends in a third direction adjacent to the first side of the aperture to a third side of the aperture, turns in the second direction and extends adjacent to the third side of the aperture and exits the one or more plate at the second side of the one or more plate.

19. The beam accelerator system of claim 18, wherein the first direction and the third direction are approximately perpendicular to the first cooling channel.

20. The beam accelerator system of claim 18, wherein the second direction is approximately parallel to the first direction.

* * * * *